US 8,361,313 B2

(12) United States Patent
Pancaldi et al.

(10) Patent No.: US 8,361,313 B2
(45) Date of Patent: Jan. 29, 2013

(54) PLANT AND METHOD FOR THE TREATMENT OF THE RECOVERY COOLING FLUID IN MECHANICAL PROCESSING PLANTS

(75) Inventors: Fabio Pancaldi, Calderara di Reno (IT); Vanni Gallocchio, Abano Terme (IT)

(73) Assignee: P.M.P.O. S.R.L., Calderara di Reno (Bologna) (IT)

( * ) Notice: Subject to any disclaimer, the term of this patent is extended or adjusted under 35 U.S.C. 154(b) by 1128 days.

(21) Appl. No.: 11/041,386

(22) Filed: Jan. 25, 2005

(65) Prior Publication Data
US 2005/0167373 A1    Aug. 4, 2005

(30) Foreign Application Priority Data

Jan. 30, 2004 (IT) ............... PD2004A0027
Jan. 30, 2004 (IT) ............... PD2004A0028
Feb. 27, 2004 (IT) ............... RE2004A0012
Mar. 22, 2004 (IT) ............... PD2004A0072
May 14, 2004 (IT) ............... PD2004A0123

(51) Int. Cl.
*B01D 29/64* (2006.01)
*B01D 29/66* (2006.01)

(52) U.S. Cl. ........ 210/106; 210/108; 210/109; 210/139; 210/167.02; 210/167.04; 210/408; 210/409; 210/411; 210/412; 210/413; 210/416.5; 210/791; 210/797; 210/798

(58) Field of Classification Search ............... None
See application file for complete search history.

(56) References Cited

U.S. PATENT DOCUMENTS

| 406,161 | A | * | 7/1889 | Chabanel | 100/104 |
| 1,946,663 | A | * | 2/1934 | Bchnke | 209/492 |
| 2,075,207 | A | * | 3/1937 | Kessler | 209/464 |
| 2,167,236 | A | * | 7/1939 | Gieseler | 55/304 |
| 2,267,086 | A | * | 12/1941 | Donohue | 210/779 |
| 2,731,151 | A | * | 1/1956 | Hopper | 210/145 |
| 3,055,290 | A | * | 9/1962 | Arvanitakis | 100/116 |

(Continued)

FOREIGN PATENT DOCUMENTS

DE    4118423    9/1992
DE    200 19 721   3/2001

(Continued)

OTHER PUBLICATIONS

Parker Hannifin Corporation, "PVLB10" Series Modular Stacking System 1/8" Valves Brochure, 14 pages. undated.*

*Primary Examiner* — Robert James Popovics
(74) *Attorney, Agent, or Firm* — Browdy and Neimark, PLLC

(57) ABSTRACT

Plant for treating the leftover liquids of mechanical processing, comprising a filtering partition (9) for filtration of the fluid and means for cleaning the partition by washing of the layer of mud deposited hereon, comprises vibratory means suitable for causing a generally fast and continuous vibratory state at least in the active portion of the partition.
The plant comprises at least one chamber (6) that is divided into two parts by the filtering partition (9), one part being intended for the exit of the filtered fluid, means suitable for causing a generally fast and continuous vibratory state at least in the active portion of the partition are associated with said chamber.
Method for treating the leftover fluids of mechanical processing, comprising filtration of the fluid through a filtering partition and periodic cleaning of the partition through washing of the layer of mud deposited here; it foresees that at least the surface of the partition on which the mud deposits is subjected to vibratory motion.

24 Claims, 25 Drawing Sheets

U.S. PATENT DOCUMENTS

| | | | | |
|---|---|---|---|---|
| 3,115,458 A * | 12/1963 | Bebech | | 210/241 |
| 3,161,591 A * | 12/1964 | Petter et al. | | 210/251 |
| 3,422,958 A * | 1/1969 | Newman | | 210/333.01 |
| 3,482,700 A * | 12/1969 | Bebech | | 210/332 |
| 3,522,768 A * | 8/1970 | Shann | | 100/125 |
| 3,796,316 A * | 3/1974 | Matz | | 210/332 |
| 4,136,035 A * | 1/1979 | Bogomolov et al. | | 210/388 |
| 4,265,771 A * | 5/1981 | Lennartz et al. | | 210/769 |
| 4,277,349 A * | 7/1981 | Schwinghammer | | 210/797 |
| 4,289,630 A * | 9/1981 | Schmidt et al. | | 210/785 |
| 4,358,371 A * | 11/1982 | Jameson et al. | | 210/415 |
| 4,387,633 A * | 6/1983 | Ballantyne | | 100/48 |
| 4,394,262 A * | 7/1983 | Bukowski et al. | | 210/103 |
| 4,552,669 A * | 11/1985 | Sekellick | | 210/798 |
| 4,660,608 A * | 4/1987 | Arai | | 141/12 |
| 4,753,257 A * | 6/1988 | Gabriel et al. | | 134/184 |
| 4,804,481 A * | 2/1989 | Lennartz | | 210/791 |
| 4,836,922 A * | 6/1989 | Rishel et al. | | 210/232 |
| 4,895,647 A * | 1/1990 | Uchiyama | | 210/171 |
| 5,032,293 A * | 7/1991 | Tuite | | 210/788 |
| 5,084,176 A * | 1/1992 | Davis et al. | | 210/350 |
| 5,106,487 A * | 4/1992 | Nemedi | | 209/44.2 |
| 5,236,583 A * | 8/1993 | Wang | | 210/181 |
| 5,328,611 A * | 7/1994 | Lenhart | | 210/393 |
| 5,380,446 A * | 1/1995 | Bratten | | 210/805 |
| 5,445,738 A * | 8/1995 | Fry et al. | | 210/384 |
| 5,466,380 A * | 11/1995 | Bratten | | 210/741 |
| 5,565,112 A * | 10/1996 | Bratten | | 210/780 |
| 5,570,749 A * | 11/1996 | Reed | | 175/66 |
| 5,593,596 A * | 1/1997 | Bratten | | 210/741 |
| 5,601,729 A * | 2/1997 | Bratten | | 210/783 |
| RE35,559 E * | 7/1997 | Lagreca | | 210/232 |
| 5,772,900 A * | 6/1998 | Yorita et al. | | 210/805 |
| 5,799,643 A * | 9/1998 | Miyata et al. | | 125/21 |
| 5,814,230 A * | 9/1998 | Willis et al. | | 210/710 |
| 5,830,369 A * | 11/1998 | Toyama | | 210/773 |
| 5,840,197 A * | 11/1998 | Ishida et al. | | 210/780 |
| 5,853,583 A * | 12/1998 | Shah | | 210/340 |
| 5,858,218 A * | 1/1999 | Setlock et al. | | 210/167.01 |
| 5,863,429 A * | 1/1999 | Bahr | | 210/385 |
| 5,874,008 A * | 2/1999 | Hirs | | 210/708 |
| 5,961,827 A * | 10/1999 | Bahr | | 210/387 |
| 5,961,847 A * | 10/1999 | Creps et al. | | 210/783 |
| 5,972,230 A * | 10/1999 | Ely et al. | | 210/797 |
| 6,001,265 A * | 12/1999 | Toyama et al. | | 210/712 |
| 6,004,470 A * | 12/1999 | Abril | | 210/776 |
| 6,053,158 A * | 4/2000 | Miyata et al. | | 125/21 |
| 6,054,059 A * | 4/2000 | Latimer et al. | | 210/767 |
| 6,096,198 A * | 8/2000 | Underhill | | 210/123 |
| 6,106,733 A * | 8/2000 | Wood | | 210/774 |
| 6,110,386 A * | 8/2000 | Underhill | | 210/744 |
| 6,161,533 A * | 12/2000 | Katsumata et al. | | 125/21 |
| 6,162,355 A * | 12/2000 | Mizuno et al. | | 210/167.02 |
| 6,197,188 B1 * | 3/2001 | Lamoureux | | 210/138 |
| 6,235,209 B1 * | 5/2001 | Bratten | | 210/784 |
| 6,293,731 B1 * | 9/2001 | Studer | | 405/129.2 |
| 6,322,693 B1 * | 11/2001 | Southall | | 210/85 |
| 6,322,710 B1 * | 11/2001 | Katsumata et al. | | 210/740 |
| 6,461,523 B1 * | 10/2002 | Greenrose | | 210/770 |
| 6,495,031 B1 * | 12/2002 | Bratten | | 210/97 |
| 6,530,438 B1 * | 3/2003 | McIntyre | | 175/66 |
| 6,533,946 B2 * | 3/2003 | Pullman | | 210/787 |
| 6,705,555 B1 * | 3/2004 | Bratten | | 241/101.2 |
| 6,846,421 B2 * | 1/2005 | Bratten | | 210/741 |
| 6,855,261 B2 * | 2/2005 | Boutte et al. | | 210/768 |
| 6,978,851 B2 * | 12/2005 | Perez-Cordova | | 175/206 |
| 7,052,599 B2 * | 5/2006 | Osuda et al. | | 210/96.1 |
| 7,056,442 B2 * | 6/2006 | Hansen | | 210/805 |
| 7,074,338 B2 * | 7/2006 | Mizuno | | 210/777 |
| 7,077,954 B2 * | 7/2006 | Bratten | | 210/223 |
| 7,134,557 B2 * | 11/2006 | Bratten | | 210/523 |
| 7,172,689 B2 * | 2/2007 | Bratten | | 210/137 |
| 7,258,784 B2 * | 8/2007 | O'Ryan et al. | | 210/108 |
| 7,306,057 B2 * | 12/2007 | Strong et al. | | 175/66 |
| 7,338,606 B2 * | 3/2008 | Bratten | | 210/741 |
| 7,357,872 B2 * | 4/2008 | Bratten | | 210/803 |
| 7,383,766 B2 * | 6/2008 | McIntosh et al. | | 100/92 |
| 7,410,569 B1 * | 8/2008 | Tilev et al. | | 210/167.02 |
| 7,662,296 B2 * | 2/2010 | Pancaldi et al. | | 210/770 |
| 7,824,547 B2 * | 11/2010 | Reynders et al. | | 210/171 |
| 7,913,854 B2 * | 3/2011 | Bratten et al. | | 210/400 |
| 8,029,670 B2 * | 10/2011 | Dietenhauser et al. | | 210/236 |
| 2002/0033278 A1 * | 3/2002 | Reddoch | | 175/57 |
| 2002/0074269 A1 * | 6/2002 | Hensley et al. | | 209/726 |
| 2003/0136747 A1 * | 7/2003 | Wood et al. | | 210/774 |
| 2004/0237809 A1 * | 12/2004 | McIntosh et al. | | 100/117 |
| 2005/0153844 A1 * | 7/2005 | McIntyre | | 507/100 |
| 2005/0167373 A1 * | 8/2005 | Pancaldi et al. | | 210/791 |
| 2005/0279715 A1 * | 12/2005 | Strong et al. | | 210/774 |
| 2008/0078726 A1 * | 4/2008 | Pancaldi et al. | | 210/770 |
| 2009/0062581 A1 * | 3/2009 | Appel et al. | | 585/241 |

FOREIGN PATENT DOCUMENTS

| | | | |
|---|---|---|---|
| DE | 102 26 463 | | 1/2004 |
| EP | 1 306 118 | | 5/2003 |
| EP | 1559469 | A2 * | 8/2005 |
| FI | 103325 | | 6/1999 |

* cited by examiner

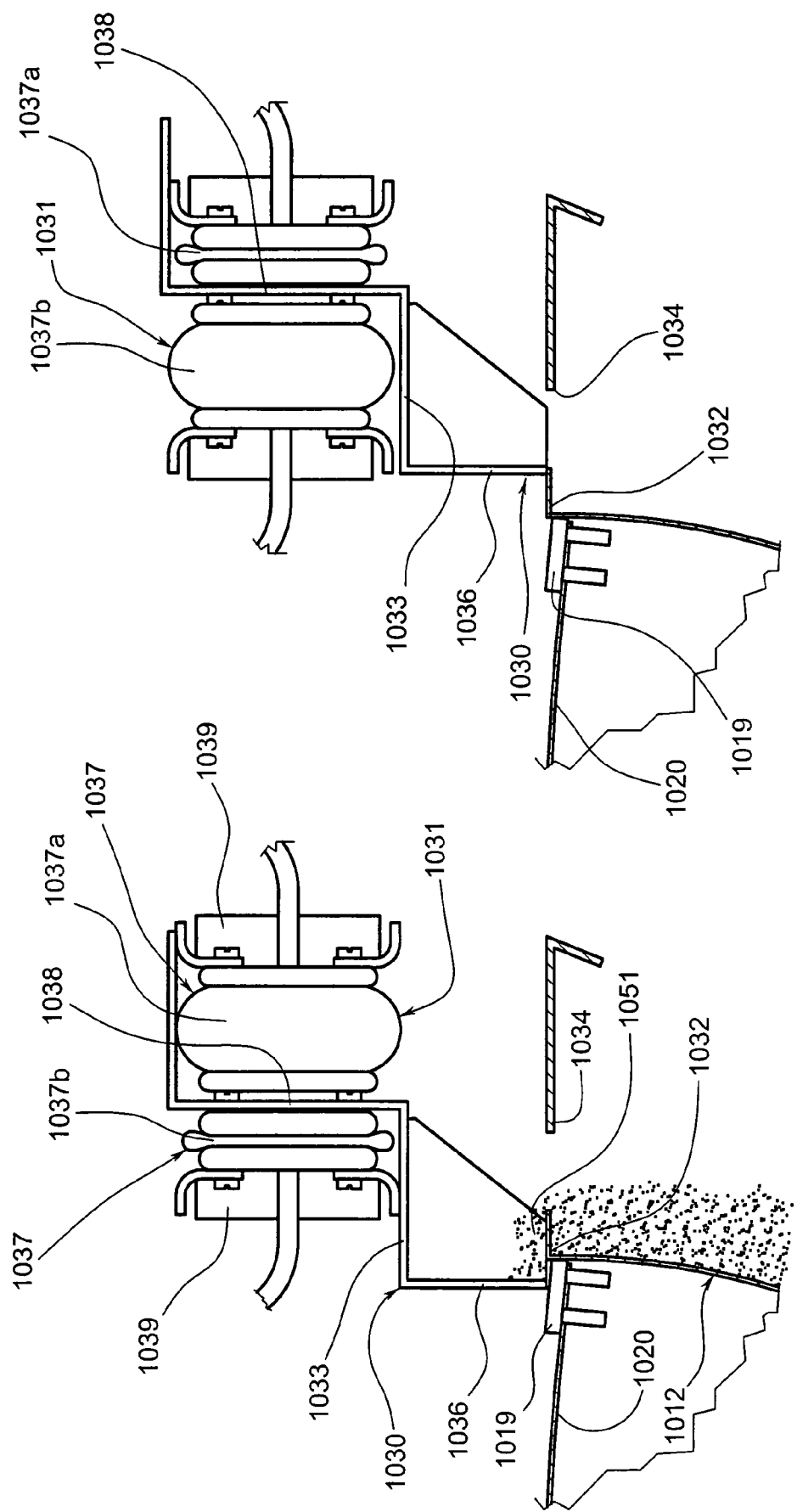

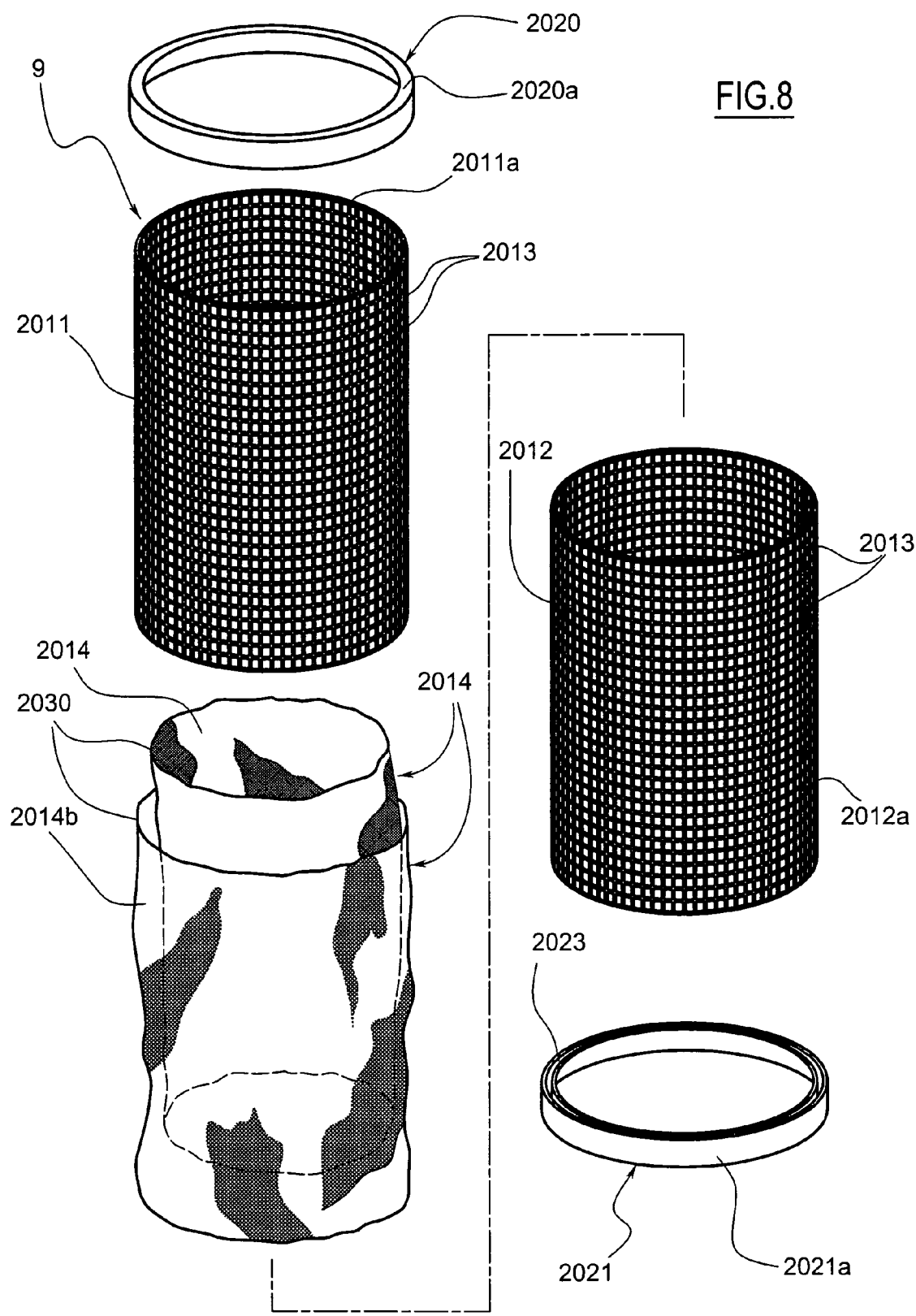

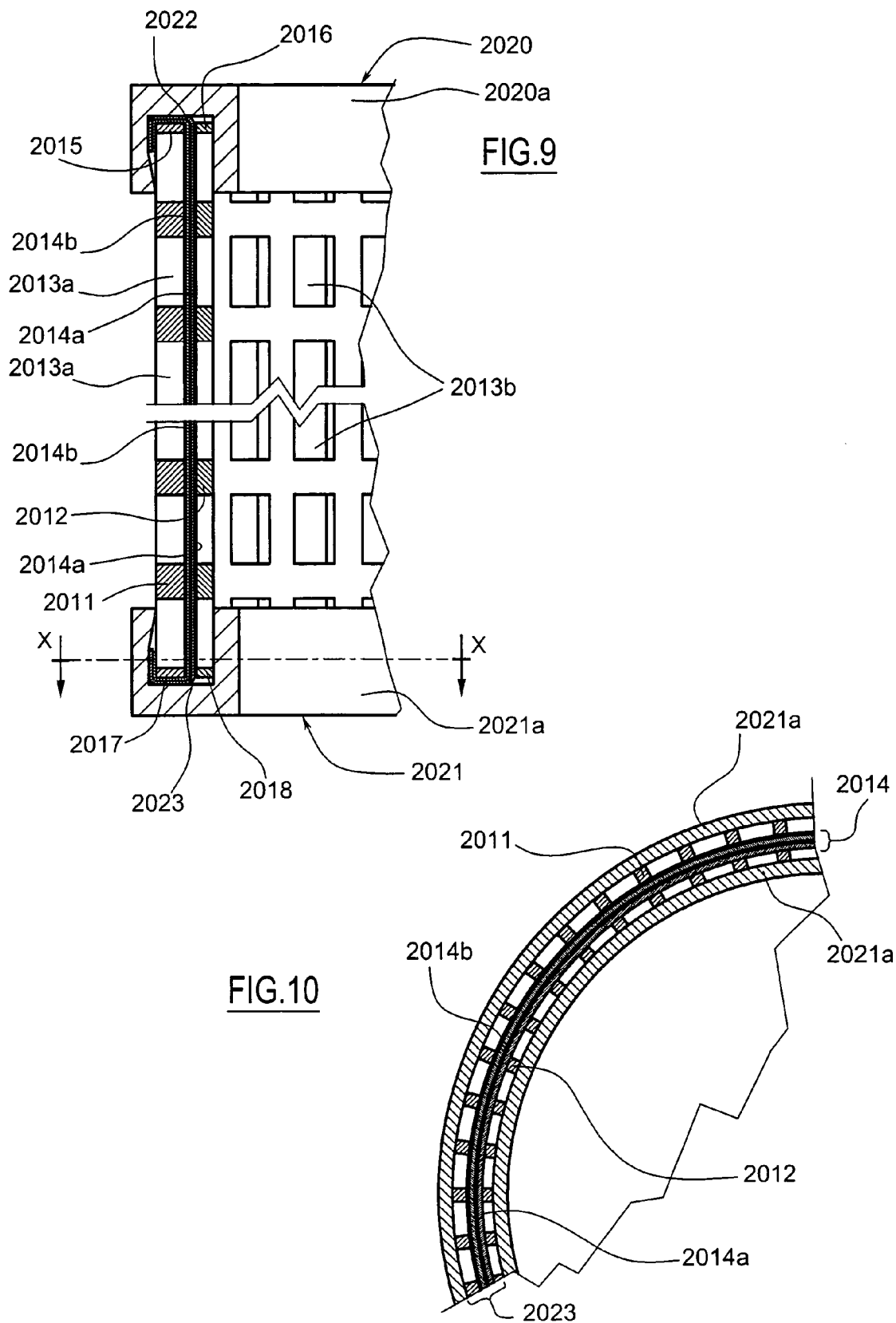

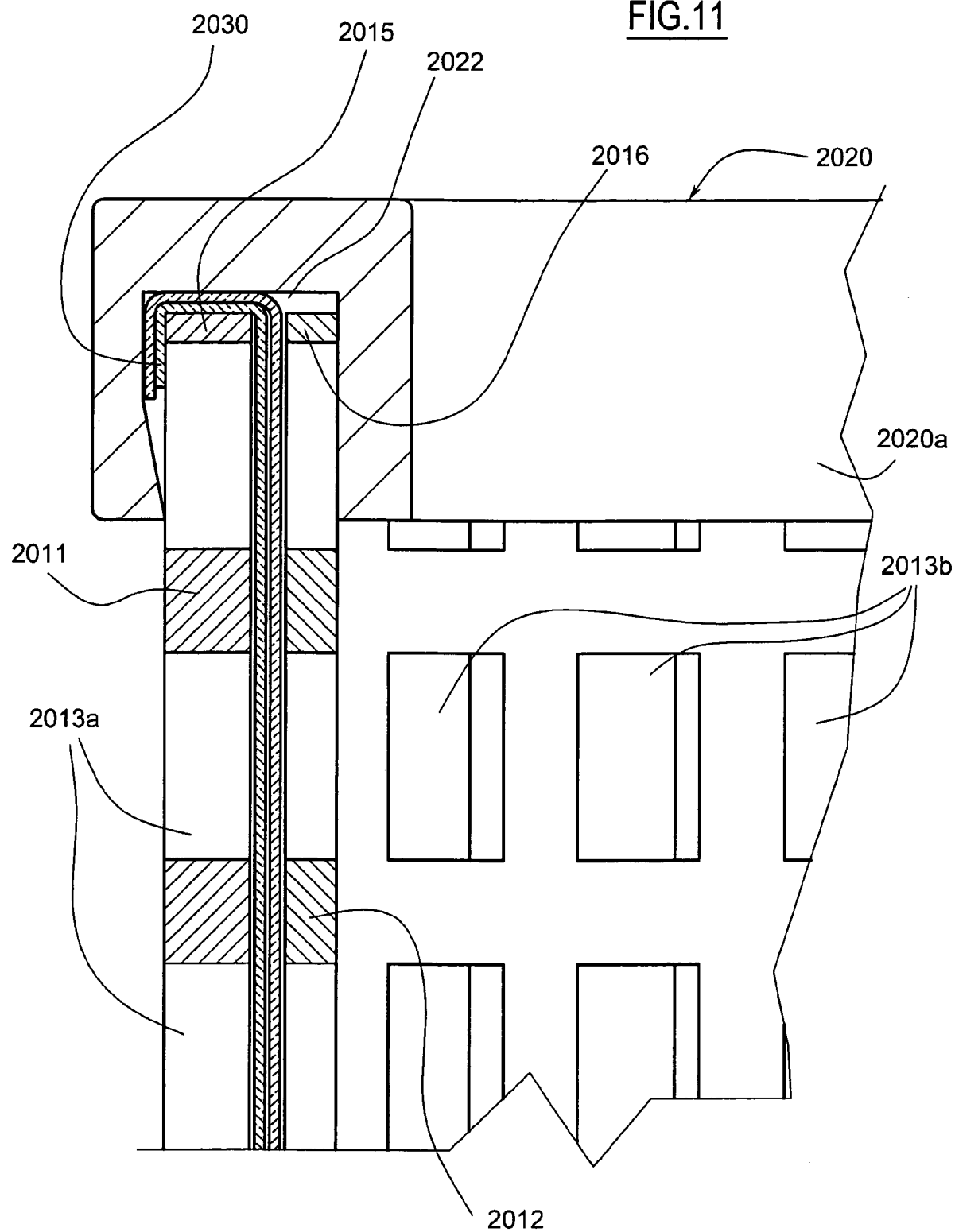

PLANT AND METHOD FOR THE TREATMENT OF THE RECOVERY COOLING FLUID IN MECHANICAL PROCESSING PLANTS

TECHNICAL FIELD

The present invention refers to the treatment of recovery waters used, sometimes suitably additived, as a cooling fluid in mechanical processing plants for chip removal.

BACKGROUND ART

In general the treatment is not limited to recovery fluid of mechanical processing, but is also carried out to recover residual liquids of other types of processing. The treatment of said waters is made necessary by a series of reasons.

A first reason is of the ecological type, and requires that the muds that form in said waters be separated to allow recycling or else discharge thereof into the environment.

A second reason is of the economic type, since a substantial amount of processing chips are contained in the muds, and when the worked piece is made from a valuable material this implies a need to recover the chips.

A third reason is the perfect and complete separation of the material filtered from the treated liquid.

A last but not least reason is the need to improve the safety of the workplace.

With particular reference to the recovery liquids of mechanical processing, they consist of water, water/oil emulsions or even just oil.

The recovery of the liquids is particularly important in fine processing, for example lapping, of metal surfaces coated with precious and valuable materials like for example nickel.

Plants suitable for treating residual water of mechanical processing are known, comprising filtering means, in series or in parallel, consisting of a toroidal filtering cartridge arranged in a cylindrical box that is divided by the cartridge into two concentric parts, the central one of which can also communicate with the outside through an opening foreseen on the bottom of the box for the evacuation of mud.

The liquid to be filtered is generally fed inside (to the centre) of the cartridge, crosses it and is evacuated outside of the box.

The solid material contained in the liquid remains lodged inside the cartridge where it forms a layer that must be periodically removed, since as it increases in thickness it progressively clogs up the cartridge.

In known plants the removal is carried out through a periodic washing in equicurrent, in other words spraying the layer of mud through nozzles and collecting the material that detaches through suitable means.

The periodic cleaning system of the cartridge takes place at fairly long time intervals, which depend upon the amount of mud contained in the liquid, and the size of the particles of which it is made up.

The washing action is generally controlled by detecting the pressure inside the cartridge, which increases as the clogging increases.

It has been noted that known plants have some difficulty in operating well when the residual liquids of fine processing are treated, like the aforementioned lapping. In these cases, indeed, the size of the chip particles is in the order of between 0.1 and 7.0 microns, and the mud not only tends to clog up the filtering cartridge very quickly, but the washing operation carried out in the conventional way is not sufficient to restore the characteristics of the cartridge.

The clogging of the cartridge, indeed, does not depend exclusively upon the thickness of the layer of mud that forms on the filtering surface, but also upon the partial insertion of the particles to be separated in the pores of the filtering surface.

The purpose of the present invention is to provide a method and plant for managing the filters in systems for treating the leftover liquids of mechanical processing that does not have the aforementioned drawbacks.

A further purpose of the present invention is that of making a separating apparatus for muds from mechanical processing that is able to work continuously without requiring that the machines for mechanical processing connected to it be stopped.

Yet another purpose of the present invention is that of making a separating apparatus for muds from mechanical processing that is compact and also easy to connect to filtering apparatuses, decanting tanks and machines for mechanical processing that are already known and operating.

Another technical task of the present invention is that of providing a double suction submerged pump structure suitable for recycling the liquids in the above mentioned filtering plant The further purpose of the present invention is that of making a double suction submerged pump structure with vertical axis in which the axial thrusts on the drive shaft are balanced and which has a pump structure that can be applied particularly to tanks for collecting liquids containing muds from mechanical processing.

Another important purpose of the present invention is that of making a pneumatic valve suitable for the above mentioned plant, that wears down less from the passage of metallic muds from mechanical processing with respect to known valves, and that can easily be managed without electrical or electronic management and control means.

In the technical tasks outlined above, an important purpose of the present invention is that of making a separating and recovery device of liquids from muds processed by the above mentioned plants that is able to make the solid part recovered from such muds disposable.

DISCLOSURE OF THE INVENTION

Said purposes are accomplished by a method and a plant having the characteristics outlined in the claims.

It concerns a plant generally in accordance with the state of the art, in which according to the invention the means responsible for filtering are advantageously subjected to a generally quick vibration at least during the filtering step.

According to a preferred embodiment the filters have the exit chamber of the treated liquid arranged in communication, through suitable piloted valves, with a pressurised air tank.

The pressure is preferably between 3 and 7 bar, and the valves are commanded to open repeatedly at predetermined time intervals for very brief periods.

Indicatively, the periods during which the valves open and close are between 0.1 and 2.0 seconds, whereas the intervals between one period and the next are between 3 and 60 seconds.

The action of the air impulses converts into liquid impulses that make the film of water in contact with the layer of solid material vibrate, keeping it disintegrated and preventing it from accumulating to such a degree as to clog up the filter.

The state of vibration caused in the film of water in contact with said layer also prevents the solid particles from inserting into the pores of the filter itself.

Thanks to this, the washing operation of the filters takes place at much longer time intervals than those according to the prior art, with substantial elimination of the idle times caused by it, and consequent increased productivity.

According to the invention the apparatus comprises a separating and recovery device of liquids from muds from mechanical processing, comprising a tubular container closed at the top by a cover and at the bottom by an openable filtering and discharge base plate hinged to it through articulation means, said container being fed through an inlet mouth open on its high part, said base plate being equipped with a lower outlet channel for the liquids extracted from the muds, and with a filtering element suitable for holding the solid part of said muds at the lower end section of said container, said device having means for raising the pressure inside said container, suitable for compressing said muds towards said filtering element, air venting means, also on the high part of the container, and moving means suitable for opening/closing said base plate.

The apparatus according to the invention can comprise also an improved filter of the type consisting of two concentric tubular bodies with reticular structure, a sieve layer being present between said two tubular bodies suitable for holding chips from mechanical processing, the end sections of said two tubular bodies, with sieve layer interposed, being sealed by a sealing edge, said sealing edges consisting of a sealing ring equipped with a slit in which said end sections reversibly insert.

According to the invention, a double suction submerged pump structure is has a vertical axis, and comprises, in a protective containment casing, a rotation shaft on which at least a pair of opposite interfacing impellers is fitted inside a chamber, for said impellers, for conveying the fluid towards a delivery, said shaft being rotatable on rotational sliding means and actuated at the top end by a motor, said shaft also having fluidic sealing means associated with it arranged between said motor and said chamber for the impellers.

Said submerged pump structure has, below said pair of rotating suction elements, a hollow tang, integral with said casing, defining a seat for the bottom end of said shaft, between said shaft and said tang being arranged said rotational sliding means and corresponding further fluidic sealing means positioned between said rotational sliding means and said chamber.

The invention comprises a distribution device of liquids consisting of a box-shaped body equipped, at the top part, with an inlet mouth open on a tank for liquids, and below such an inlet mouth, with a discharge mouth for the liquid contained therein, said inlet mouth having a pneumatic valve according to the invention, suitable for regulating its opening and closing.

Said device comprises air compression means for closing said inlet mouth through said pneumatic valve and for blowing pressurised air into said top part of said box-shaped body, to make said liquid flow inside said box-shaped body from said discharge mouth.

Said pneumatic valve comprises a frame equipped with a first and second opening, one for inlet and one for outlet, for the passage of fluids, inside said frame being arranged an air chamber that, inflating, is suitable for pushing a shutter against said first through opening, said air chamber being arranged sandwiched between compression means, suitable for disengaging said shutter from said first through opening in the absence of pressure inside said air chamber.

BRIEF DESCRIPTION OF DRAWINGS

Further characteristics and advantages of the invention shall become clearer from the description of a preferred but not exclusive embodiment thereof, illustrated for indicating and not limiting purposes in the attached tables of drawings, in which:

FIG. 6 illustrates the detail of FIG. 2 in first operative position;

FIG. 7 illustrates the detail of FIG. 2 in a second operative position;

FIG. 8 represents an exploded perspective view of an improved filter according to the invention;

FIG. 9 represents a side section view of an improved filter according to the invention;

FIG. 10 represents the cross section X-X indicated in FIG. 9;

FIG. 11 represents a detail of FIG. 9;

BEST MODE OF CARRYING OUT THE INVENTION

Figure 1:
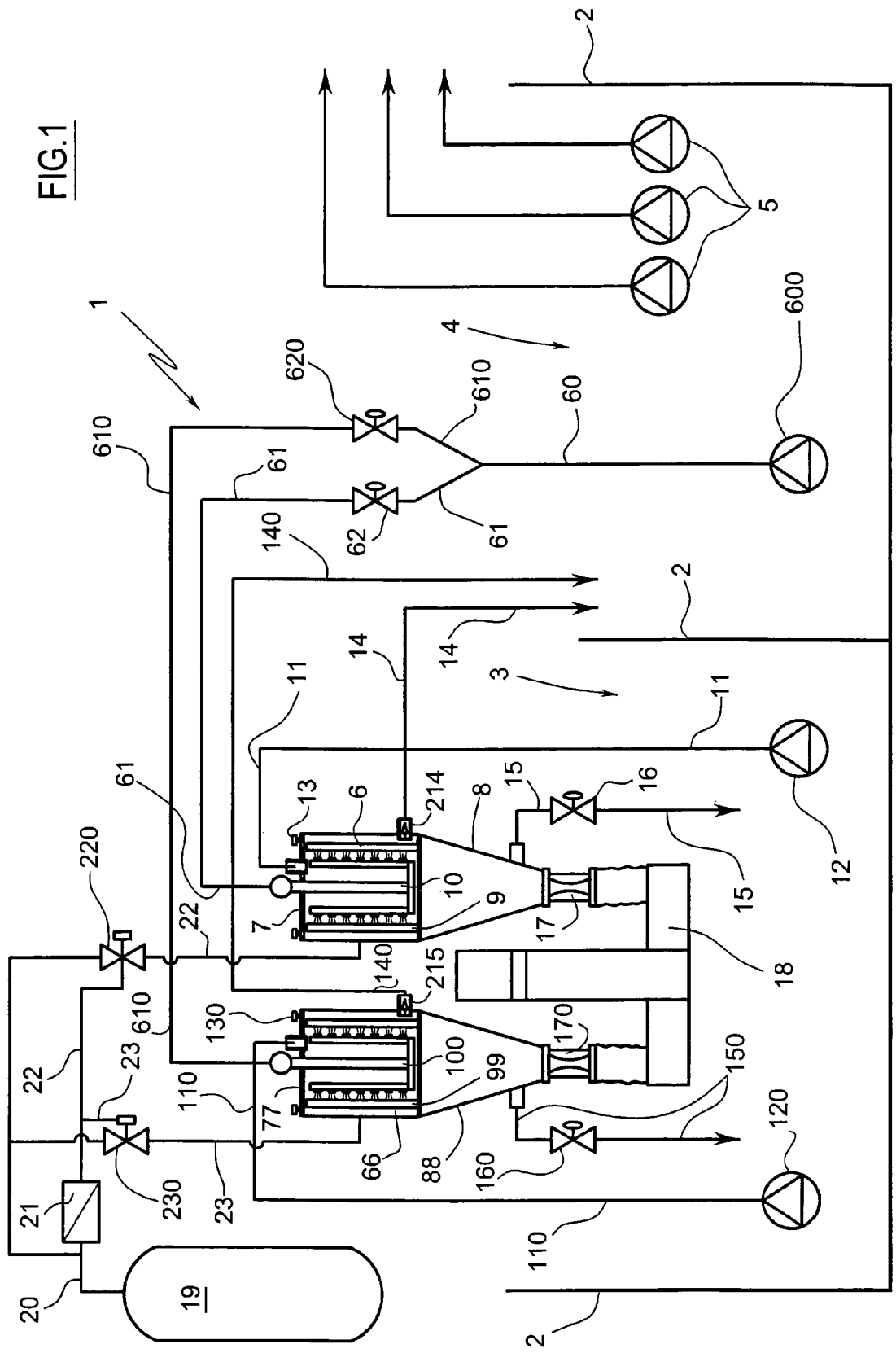
FIG. 1 represents a scheme of an example plant according to the invention.
Figure 2:
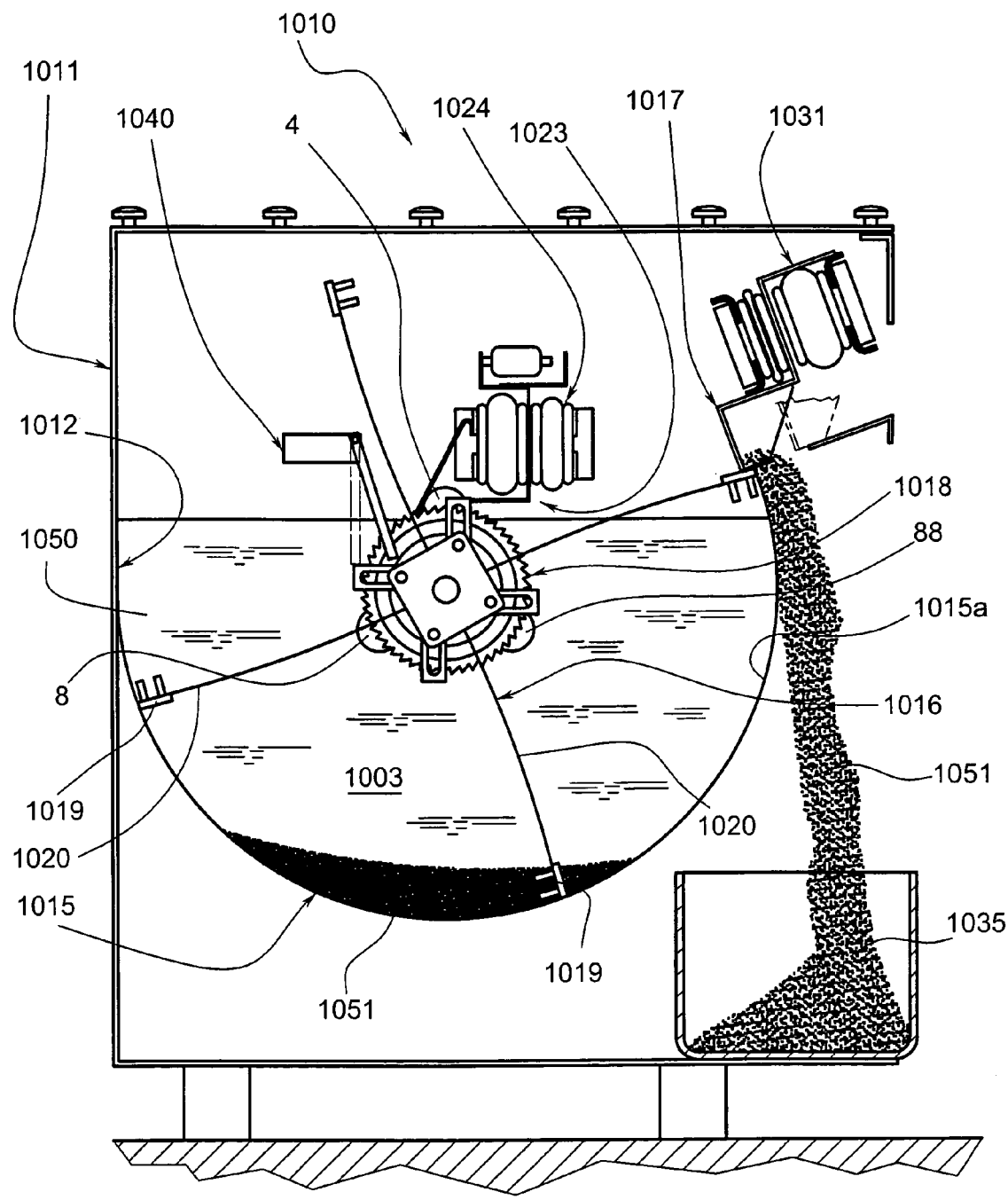
FIG. 2 represents a side partial section view for muds from the filtering plant of a separating apparatus of FIG. 1.
Figure 3:
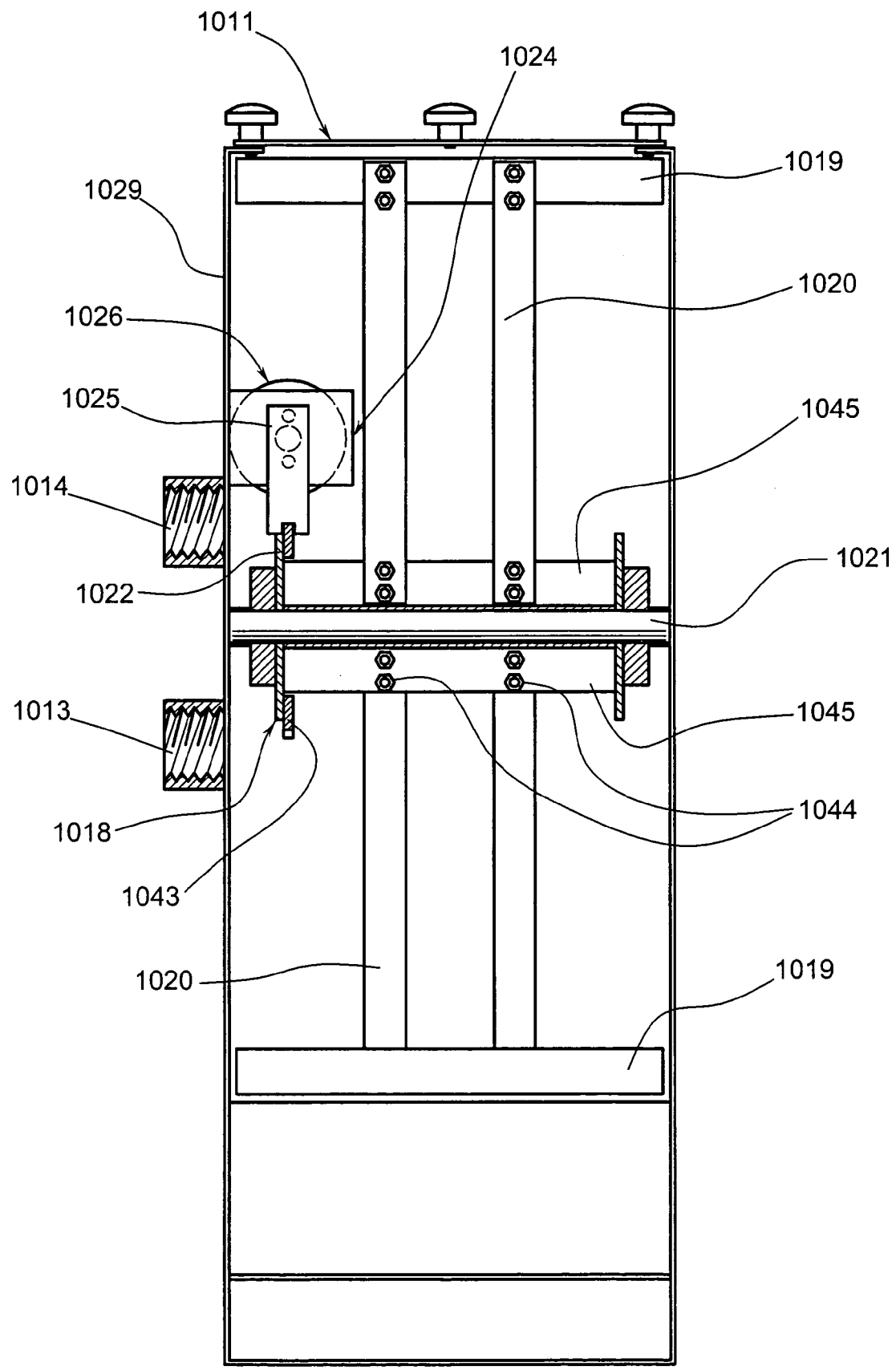
FIG. 3 represents a rear section view of the apparatus of FIG. 2.
Figure 4:
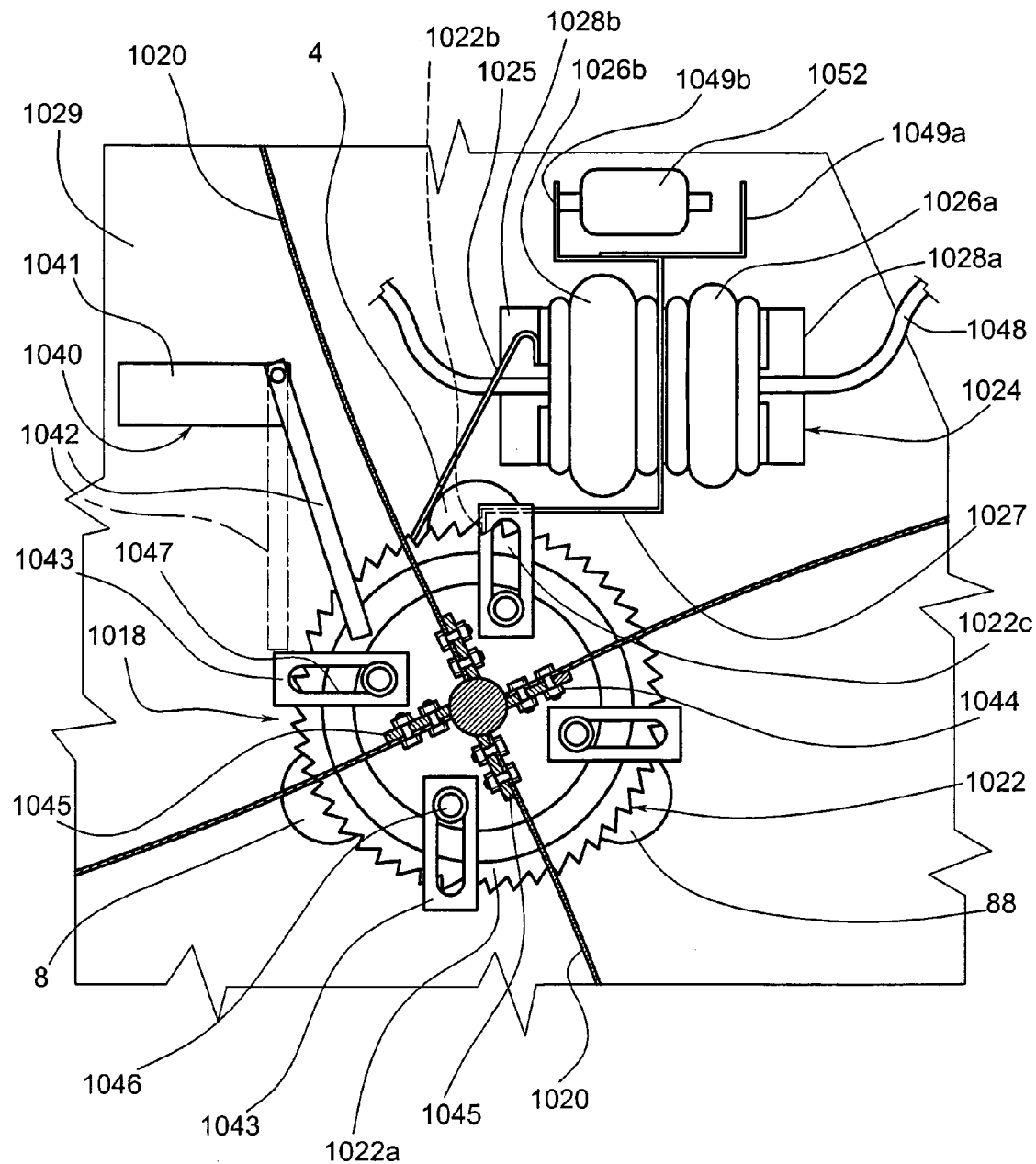
FIG. 4 represents a partial detail of FIG. 2.
Figure 5:
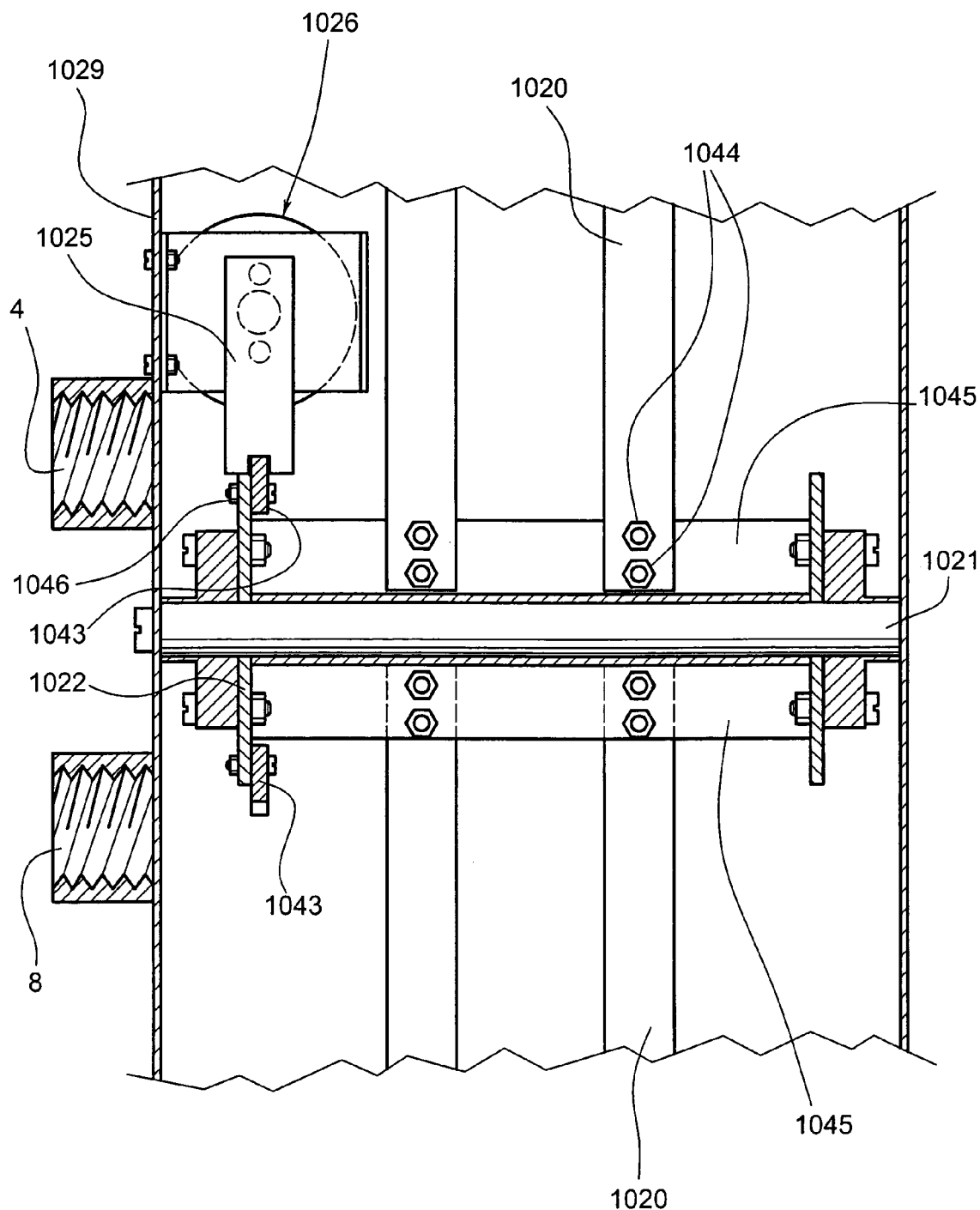
FIG. 5 represents a detail of FIG. 2.

In FIG. 1 a plant is illustrated, wholly indicated with reference numeral 1, which is operatively connected with a mechanical processing station with chip removal, like for example a CCN type centre.

Said station, or centre, has not been shown for the sake of simplicity, and also because it is not relevant to any characterising part of the INVENTION.

Suffice to say that said processing with chip removal is carried out in the presence of a suitable cooling fluid, usually water possibly additived with products and suitable agents, a water/oil emulsion or just oil.

The chips can be quite coarse or relatively very fine as specified in the preamble.

The plant shown comprises a tank 2 that is divided into a collection basin 3 (on the left in the Fig.) of the dirty fluid coming from said processing, and a collection basin 4 of the clean, i.e. filtered, fluid (on the right in the Fig.).

At least one recirculation pump (in the Fig. three in number), suitable for supplying the clean fluid to said station, or another suitable place, and a pump 600 that is intended to send clean fluid to the washing device 10, 100 arranged in the inner chamber of the filtering group of the plant 1 through a delivery duct 60 that separates into two branches 61, 610 individually intercepted by a valve 62, 620, draw from the basin 4.

In the present case said filtering group comprises two side-by-side identical cylindrical chambers with vertical axes that are set above the basin 3.

Each individual chamber comprises an outer casing 6 and 66, respectively, which is closed at the top by a cover 7, 77 and at the bottom communicates with a funnel-shaped body 8, 88.

In the casing 6, 66 a per se known toroidal filtering cartridge 9, 99 is coaxially arranged, which divides it into an inner zone and an outer zone.

In turn, said inner zone houses a washing device 10, 100, also of the known type, which comprises a series of vertical spraying arms.

Said arms are individually equipped with a plurality of nozzles facing towards the inner surface of the cartridge 9, 99 and are connected to a common central collector that is supplied with clean fluid by the respective branch 61, 610 of the common delivery duct 60.

In particular, said supply of clean fluid takes place through the cover 7, 77 through the washing device where the delivery duct 11, 110 of a pump 12, 120 that draws from the basin 3 also flows.

On the cover 7, 77 pressure detection means 13, 130 are also installed that are connected with the general control and adjustment system of the plant.

Moreover, a discharge duct 14, 140 of the filtered fluid that pours into the basin 4 derives from the lower band of the casing 6, 66 and is intercepted by a pneumatic double effect valve 214, 215.

Furthermore, from the lower end part of the funnel 8, 88 a normal discharge duct 15, 150 of the washing fluid derives that is intercepted by a valve 16, 160 and pours into the basin 3, and an equally normal openable discharge mouth of the washing liquid 17, 170 with which a collector 18 of the recovered muds is associated underneath is associated with the lower end of the same funnel 8, 88.

In accordance with the INVENTION, the plant 1 is provided with a compressed air source, in the present case consisting of a tank 19.

A delivery duct 20, equipped with a controlled open-close valve 21, from which extend two branches 22 and 23 intercepted by the valves 220 and 230, derives from the tank 19.

Finally, said two branches 22, 23 pour into the casings 6 and 66, respectively, so as to supply said compressed air to the outer zones thereof where the filtered fluid passes.

It should be specified that a generally constant pressure is maintained in the tank 19, in the order of 3-7 bar according to the processing taking place.

Moreover, the piloted valve 21 is structured so as to open repeatedly during the course of processing at predetermined time intervals and for very brief time periods.

Said opening time period is about 0.1-2 minutes seconds, and the interval between two consecutive periods is in the order of 3-60 seconds.

The piloted valve 21 is obviously placed under the control of the general control and adjustment system of the plant 1. It can be of any known type suitable for the purpose, for example model PVLB101618W2 of American company PARKER has proven suitable.

Lastly, it should be specified that said general control and adjustment system also comprises memory means in which the desired maximum value that the pressure can reach in the inner zone of the casing 6, 66 during filtration is stored, a value that indicates the maximum degree of clogging of the cartridge 9, 99.

The described plant 1 operates substantially as follows, supposing that both of the chambers of the filtration group are used (in the contrary case, for example use of just the right chamber, the following will be deactivated: the delivery branch 610 of the clean fluid; the delivery pump 110 of the dirty fluid; and the delivery branch 23 of the pressurised air).

During the filtration step, the delivery branch 600 of the clean fluid is deactivated; the pumps 12 and 120 send the dirty fluid inside the inner zone of the casings 6 and 66; the filtered fluid crosses the cartridges 9 and 99 and discharges into the basin 4 through the ducts 14 and 140; and the valves 16, 160 and the mouths 17, 170 are closed.

Moreover, the piloted valve 21 opens and closes at least twice for periods of 0.5-2 seconds at intervals of 3-60 seconds.

These quick and close together opening and closing cycles of the valve 21 create pressure impulses in the outer zone of the filtering chambers, thus also on the film of water present on the outer surface of the cartridges 9 and 99, which also propagate to the filtering material of said cartridges 9, 99.

They have a dual function, the first of which is that of dispersing the layer of mud that has deposited on the inner surface of the cartridges 9, 99, which once broken collects in the funnel 8, 88 below, and the second consists of preventing at least part of the finest particles present in said mud from clogging up the interstices or pores of the cartridges 9, 99.

Thanks to this, the washing step of the cartridges 9, 99 can be deferred in time, thus reducing the idle times of the plant 1.

When the predetermined maximum operating pressure is reached in at least one of the casings 6, 66, then the corresponding delivery pump 12 or 120 of the dirty fluid is stopped, and at the same time the respective delivery branch 61 or 610 of the clean fluid is activated, the valve 16 or 160 for discharging the washing fluid into the basin 3 is opened, and the mud is discharged into the container 18 through the mouth 17 or 170.

The vibrating state of the cartridges 9, 99 caused by the compressed air impulses is preferably also maintained during the washing step.

Once the washing period is over the previous filtering configuration is restored.

With reference to the FIG. 2 to 7, a separating apparatus for muds is wholly indicated with reference numeral 1010.

Such an apparatus 1010 consists of a box-shaped body 1011 inside which there is a decanting tank 1012.

Such a decanting tank 1012 is supplied by two entry mouths 1013, from which flows mud from metal processing coming from a further upstream decanting tank, or from a previous filter device such as this disclosed in FIG. 1.

The decanting tank 1012 has an outlet mouth 1014 for the liquid 1050 at least partially separated from the mainly solid residue 1051, which tends to deposit on the bottom 1015 of the tank 1012.

The outlet mouth 1014 opens at a greater height from the ground than the entry mouths 1013, the latter being connected to the funnels 8, 88 of FIG. 1.

Inside the decanting tank 12 there are means 1016 for picking up the mainly solid residue 1051 decanted, suitable for lifting such residue 1051 from the bottom 1015 up to the discharge means 1017 for the residue 1051 itself.

The pick-up means 1016 comprise a rotation device 1018 for four scraping blades 1019.

Each blade 1019 is connected through a pair of paddles 1020 to the rotation device 1018.

The paddles 1020 are of the leaf spring type, and slightly arched with convexity facing in the direction of advance.

Such a configuration of the paddles 1020 prevents the blades 1019 from jamming blocking the entire apparatus should they have to move too great an amount of residue 1051 or in the case in which they intercept other types of obstacles on their path.

The leaf spring configuration thus allows the paddles 1020 to bend in the opposite direction to the advancing direction, and thus allows possible obstacles in which the scraping blades 1019 can get caught to be passed.

The blades 1019, indeed, in their rotary motion about the axis of the rotation device 1018, scrape the bottom 1015 of the tank 1012, and lift the mainly solid residue 1051 deposited there up to said discharge means 1017.

The decanting tank 1012 has a substantially arc of circumference shaped vertical longitudinal section 1015a.

Such an arc 1015a, which in the embodiment described here is greater than 180°, defines the path that the blades 1019 make the residue 1051 lifted from the bottom 1015 follow and simultaneously acts as an edge that holds such raised residue 1051 on the blades 1019.

The rotation device 1018 is given by a rotation shaft 1021 to which the paddles 1020 are integrally fixed, a gear wheel 1022 with saw teeth 22a being in turn fixed to the shaft 1021.

The paddles 1020 are locked with threaded elements 1044 to plate-shaped supports 1045 welded radially and arranged longitudinally on the rotation shaft 1021.

The gear wheel 1022 is actuated, or rather rotated, by a ratchet gear 1023 the movement of which is managed by a first device 1024 for generating alternative motion.

The ratchet gear 1023 also comprises an anti-return sprag 1025 for said gear wheel 1022.

The first device for generating alternative motion 1024 is made up of two pneumatic valves 1026, a first valve 1026a and a second valve 1026b, respectively.

A thrusting pawl 1027 for the gear wheel 1022 is sandwiched between the two pneumatic valves 1026a and 1026b.

Each of the pneumatic valves 1026 is fixed by the non-engaged end with the thrusting pawl 1027, respectively the first end 1028a of the first valve 1026a and second end 1028b of the second valve 1026b, to a wall 1029 of the box-shaped body 1011.

The discharge means 1017 consist of a removal element 1030 moved by a second device for generating alternative motion 1031 and projecting, in extracted position, from a discharge edge 1032 of the decanting tank 1012.

Such a discharge edge 1032 is arranged above the free surface of the liquid 1050.

The removal element 1030 is in the form of an upturned drawer 1033.

Such an upturned drawer 1033, in extracted position, intercepts a scraping blade 1019 rising from the bottom 1015 of the tank 1012, and, sliding on such a blade 1019 towards a withdrawn position, removes the mainly solid residue 51 present on the adjacent blade 1019.

The upturned drawer 1033 drags the residue 1051 from the scraping blade 1019 situated at the discharge edge 1032, up to a discharge passage 1034 defined on the box-shaped body 1011 near to the discharge edge 1032 itself.

Such a passage 1034 opens onto a removable container 1035 for collecting and disposing the mainly solid residue 1051.

The removal element 10030, or rather the upturned drawer 1033, is arranged in withdrawn position with its inner face 1036 at a distance no less than the radius of the arc of circle section of the tank 1012 away from the axis of the rotation shaft 1021 of the blades 1019.

The second device for generating alternative motion 1031 is given by two further pneumatic valves 1037, between which the upturned drawer 1033 is sandwiched, through a rod 1038 that supports it.

Each of such further pneumatic valves 1037 is fixed by the end 1039 not engaged with the rod 1038 to the wall 1029 of the box-shaped body 1011.

The second device for generating alternative motion 1031 is controlled by a timing mechanism 1040 that coordinates its alternate translating movement with the rotary movement of the scraping blades 1019.

The timing mechanism 1040 comprises a valve 1041 for controlling the pressure inside the second device for generating alternative motion 1031.

Such a control valve 1041 is fixed to a wall 1029 of the box-shaped body 1011 and is actuated through an automatic return leverage 1042, pushed by a cam 1043 rotating integrally with the blades 1019.

The timing mechanism 1040 comprises as many cams 1043 as there are scraping blades 1019.

Such cams 1043, equally spaced, are fixed substantially radially to the gear wheel 1022 through further threaded elements 1046 slotted in corresponding slots 1047 open on the cams 1043.

The operation of the apparatus 1010 according to the invention is the following.

The pneumatic valves 1026 are alternatively filled with pressurised air coming, through the ducts 1048, from a pump (not illustrated, for the sake of simplicity).

The inflation of the first valve 1026a causes the translation of the thrusting pawl 1027, which thrusts the gear wheel 1022 into rotation, through the saw tooth 1022b on which it is rested.

The gear wheel 1022, and with it the scraping blades 1019, carries out a part rotation until the anti-return sprag 1025 clicks onto the saw tooth next to the one in which it was engaged before the first valve 1026a inflated.

The first valve 1026a, inflating, as well as translating the pawl 1027, moves a first switching appendix 1049 in the same direction, which acts on a pressure switch 1052.

The pressure switch 1052 deviates the compressed air from the first valve 1026a to the second valve 1026b, which by inflating leads to the simultaneous deflation of the first valve 1026a, to the withdrawal of the pawl 1027 to ride over an underlying tooth 1022c of the gear wheel 1022 and, through a second switching appendix 1049b, to the subsequent further activation of the switch 1052.

Such further switching takes the compressed air back into the first valve 1026a, which repeats the thrusting of the pawl 1027, this time on the tooth 1022c.

The rotation of the gear wheel 1022 and with it of the shaft 1021, makes the blades 1019 move, through the paddles 1020.

The blades 1019, as already stated, scrape the bottom 10015 of the tank 1012 and lift part of the residue 1051 towards the discharge edge 1032.

The cams 1043 also rotate integrally with the gear wheel 10032.

The relative position of cams 1043 and paddles 1020 is such that a cam 1043 acts on the leverage 1042 so that the upturned drawer 1033 is arranged in extracted position shortly before the passage of the corresponding blade 1019 loaded with residue 1051.

This is made possible by the control valve 1041, which, switched through the leverage 1042, deviates the pressurised air to the first further pneumatic valve 1037a.

When the cam 1043 releases the leverage 1042, the control valve 1041 deviates the compressed air flow from the first 1037a to the second further pneumatic valve 1037b, which, inflating, drags the drawer 1033 towards the discharge passage 1034, in withdrawn position.

The drawer 1033, in extracted position, intercepts the blade 1019, which rises from the bottom 1015 and, closing into withdrawn position, removes the at least partially solid residue 1051 carried by the blade 1019.

The re-entry of the drawer 1033 into withdrawn position frees the trajectory of the blade 1019 that goes back along its path.

The residue 1051 removed by the blade 1019 is dragged by the drawer 1033 beyond the edge 1032 up to the passage 1034, through which the residue 1051 falls into the container 1035 below.

The rotary movement of the apparatus 1010 is therefore in successive clicks, defined by the number of teeth 1022a of the gear wheel 1022 and by the action of the first device for generating alternative motion 1024.

The second device for generating alternative motion 1031, which controls the removal element 1030, is actuated at predetermined intervals in relation to a certain number of clicks completed by the ratchet gear 1023.

With reference to the FIG. 8 to 13, the improved filter according to the invention is wholly indicated with reference numeral 2010.

Such an improved filter 2010 consists of a first and second tubular body, 2011 and 2012 respectively in the Fig.s.

Such two tubular bodies 2011 and 2012 both have a reticular structure, having a plurality of square windows 2013.

The two tubular bodies 2011 and 2012 are concentric and the inner surface 2011a of the first tubular body 2011 is adjacent to the outer surface 2012a of the second tubular body 2012.

The first and second tubular body 2011 and 2012 are arranged with respect to each other so that the windows 2013a of the first correspond to the windows 2013b of the second.

Between the two tubular bodies 2011 and 2012, or rather between the two adjacent surfaces 2011a, 2012a, there is a sieve layer 2014 suitable for holding chips from mechanical processing.

In the present embodiment, such a sieve layer 2014 is made up of a first inner layer 2014a and a second outer layer 2014b.

The lips 2030 of such first and second layers 2014a, 2014b are angled to surround the end sections 2015 and 2017, upper and lower respectively, of the first tubular body 2011.

The end sections, both the upper ones, indicated with 2015 for the first tubular body 2011 and with 2016 for the second tubular body 2012, and the lower ones, 2017 for the first tubular body 2011 and 2018 for the second tubular body 2012, are each sealed by a sealing edge, which pinches the lips 2030 on the end sections of the first tubular body 2011.

The upper sealing edge is indicated by number 2020 and the lower sealing edge is indicated by number 2021.

The improved filter 2010 is characterised in that each of the sealing edges 20020 and 2021 consists of a sealing ring 2020a and 2021a, respectively.

Each ring is equipped with a slit 2022 and 2023 respectively, in which the end sections 2015 and 2016 in the slit 2022 of the upper ring 2020a and 2017 and 2018 in the slit 2023 of the lower ring 2021a insert.

The two tubular bodies 2011 and 2012, in the present embodiment, are cylindrical.

The two layers 2014a and 2014b that make up the sieve layer 2014 are advantageously made from nylon.

Such a sieve layer 2014, in a variant embodiment of an improved filter according to the INVENTION 2010, can have at least an outer layer of the two layers of which it consists made from steel mesh.

Each sealing ring 2020a and 2021a is made from rubber.

Figure 12:
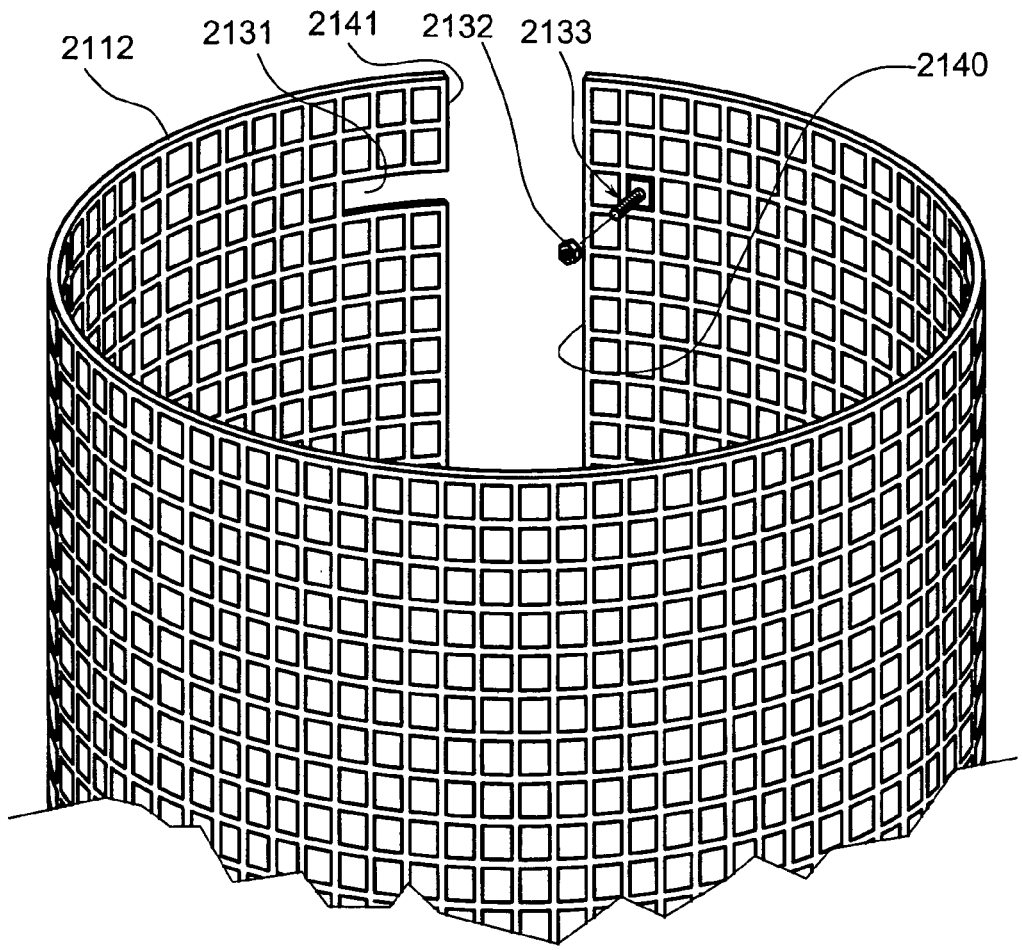
FIG. 12 illustrates a variant embodiment of a component of an improved filter according to the invention.
Figure 13:
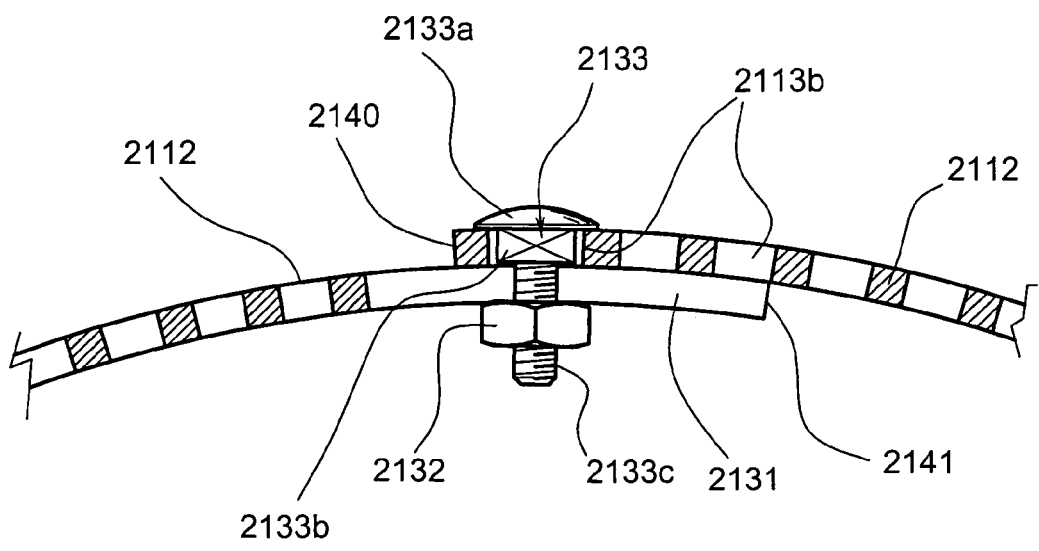
FIG. 13 illustrates a detail in section of the variant embodiment represented in FIG. 12.

In a variant embodiment of an improved filter according to the invention the second tubular body, indicated with 2112 in FIGS. 12 and 13, is obtained by shaping a substantially rectangular portion of metallic mesh into a cylinder, without however welding together the two interfacing sides 2140 and 2141.

One of such sides, in the example described here the side 2141, has at least two slits 2131, arranged symmetrically, suitable for receiving in reversible engagement a threaded element 2133 slotted into a corresponding window 2113b present close to the opposite side, in this case 2140.

The slit 2131, in the present example, is open on the outside of the side 2141.

Such a threaded element 2133 has a substantially flat head 2133a, a body with a square section 2133b, shaped to engage without rotating in a window 2113b, and a threaded shank 2133c that inserts in the slit 2131 and onto which a lock nut 2132 screws.

The tightening of the nut 2132 locks the two sides 2140 and 2141 in position one on top of the other.

Such joining of the two sides 2140 and 2141 through threaded elements instead of through welding allows a large saving in terms of processing.

Moreover, such a solution eases the removal of the sieve layer 2014.

Indeed, by loosening the nut 2132 it is possible to elastically compress the second tubular body temporarily decreasing its diameter, allowing the extraction of the layer 2014 without risking tearing it.

In the same way, the elasticity of such a second tubular body 2112 ensures that it tends to expand once inserted inside the first tubular body, thus perfectly adhering to the sieve layer 2014 and advantageously pressing it against the first tubular body.

Using a second tubular body 20112 in the variant embodiment just described allows a second embodiment of the sieve layer 2014 to be used (not illustrated for the sake of simplicity).

Such a second embodiment is given by a sieve layer 2014 not stitched longitudinally.

Such an unstitched sieve layer 2014 is obtained from a substantially rectangular portion of fabric, unwoven fabric, metallic mesh or similar (or combinations of such materials)

arranged adjacent to the inner surface 11a inside the first tubular body 11 with its unwoven longitudinal lips overlapping.

Once the layer 2014 with overlapping lips is arranged adjacent to the inner surface 2011a, the second tubular body 2112 is inserted in the variant embodiment described above.

Such a second tubular body 2112, not yet locked by the clamping of the nut 2132 to the threaded element 2133, dilating and increasing its diameter, compresses the layer 2014 against the first tubular body 2011.

The layer 2014, although not stitched longitudinally, is thus immobilised between the two tubular bodies.

The fact that there is no stitching of the sieve layer 2014 gives a very big saving in terms of labour, machine time and in terms of raw materials, since the thread with which the longitudinal lips are stitched possesses special mechanical characteristics and strength, and therefore is generally very expensive.

Also in this case, the lips 2030 of the layer 2014 wind around the end sections 2015 and 2017, upper and lower respectively, of the first tubular body 2011.

An improved filter 2010 according to the invention once clogged, or rather if it is no longer able to filter the liquid, can be fully restored by simply removing the sealing rings 2020a and 2021a, separating the second tubular body 2012 from the inside of the first tubular body 2011, and extracting the sieve layer 2014.

Figure 14:
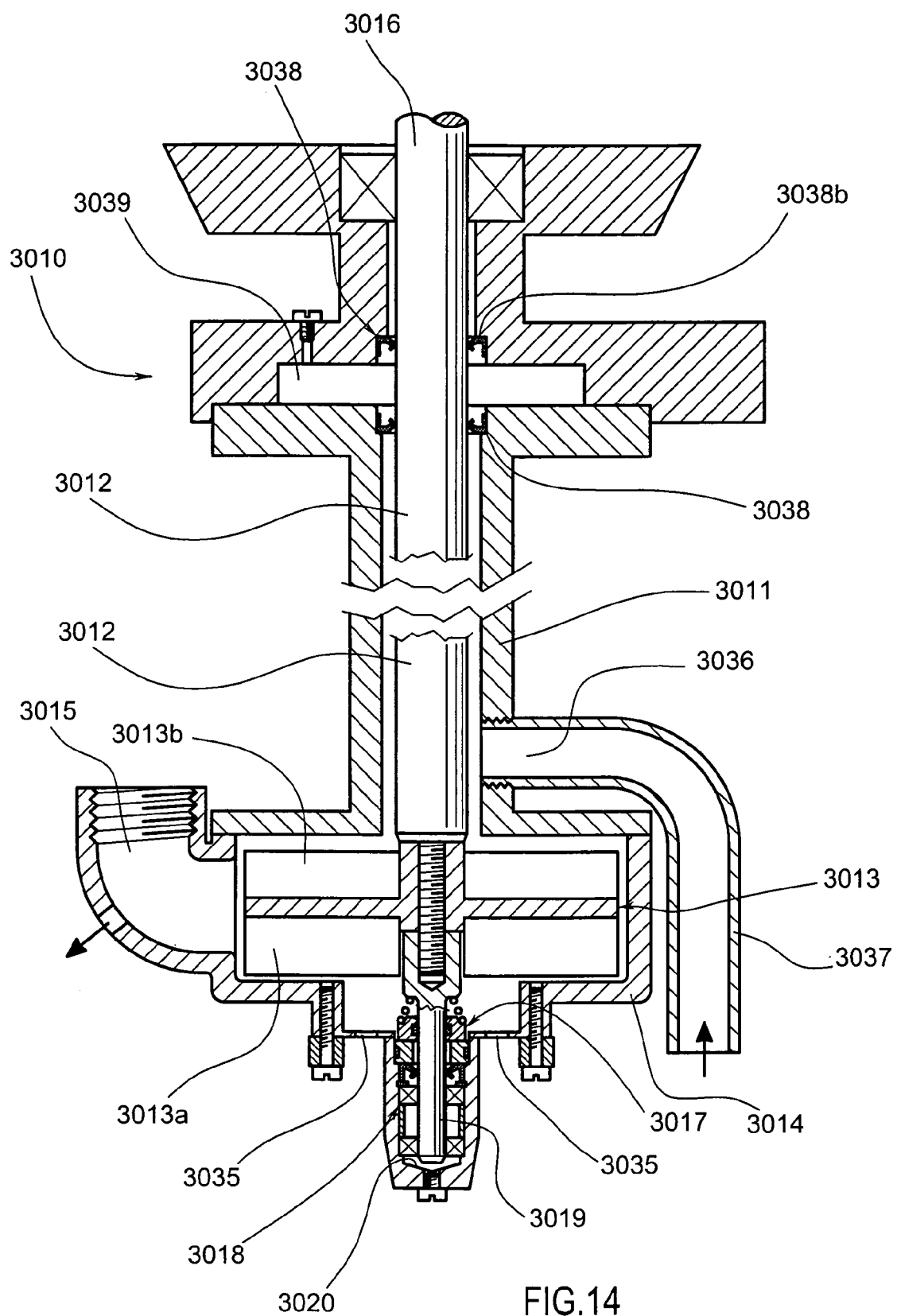
FIG. 14 represents a side section view of a submerged pump structure according to the invention in a first embodiment.
Figure 15:
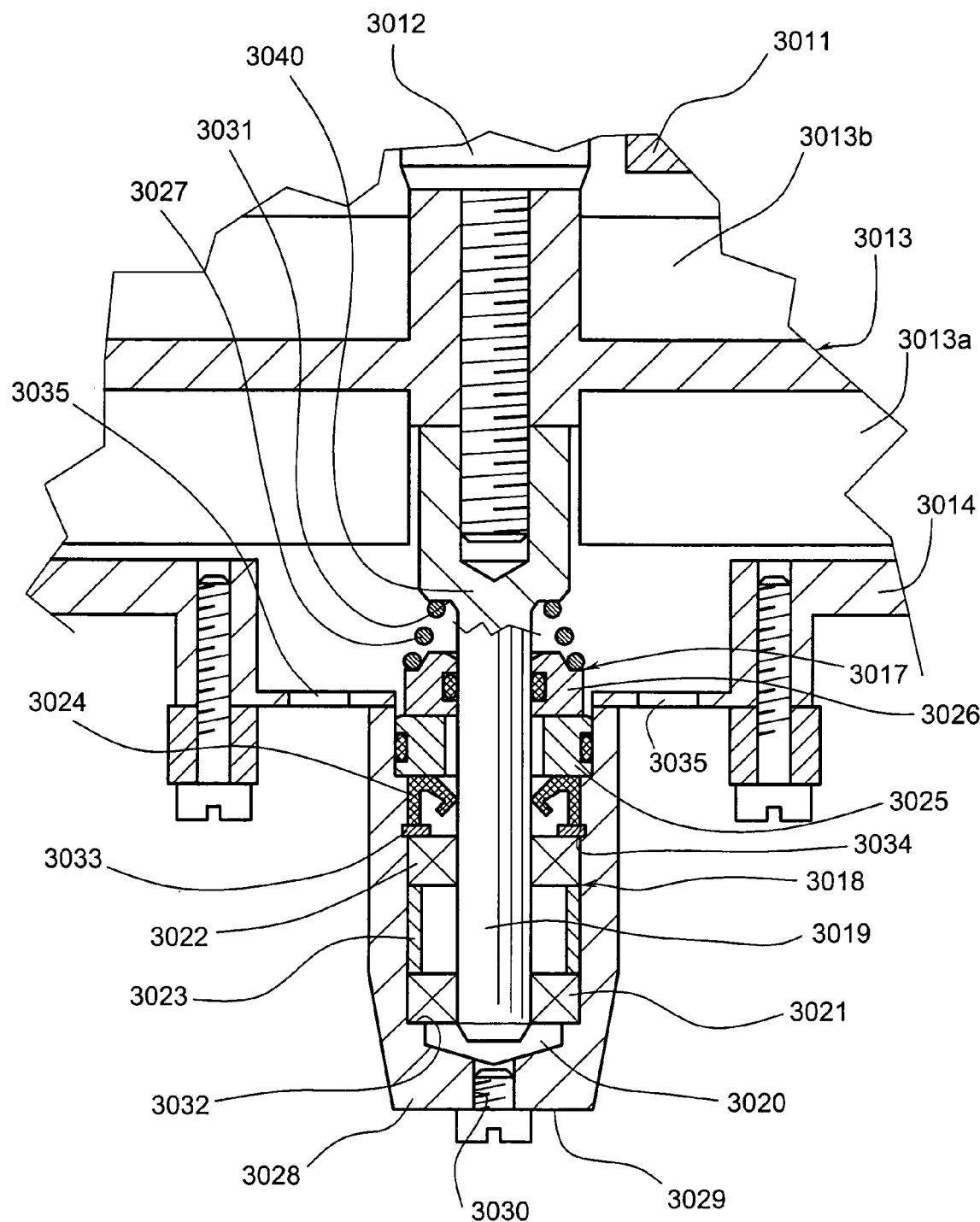
FIG. 15 represents a detail of FIG. 14.
Figure 16:
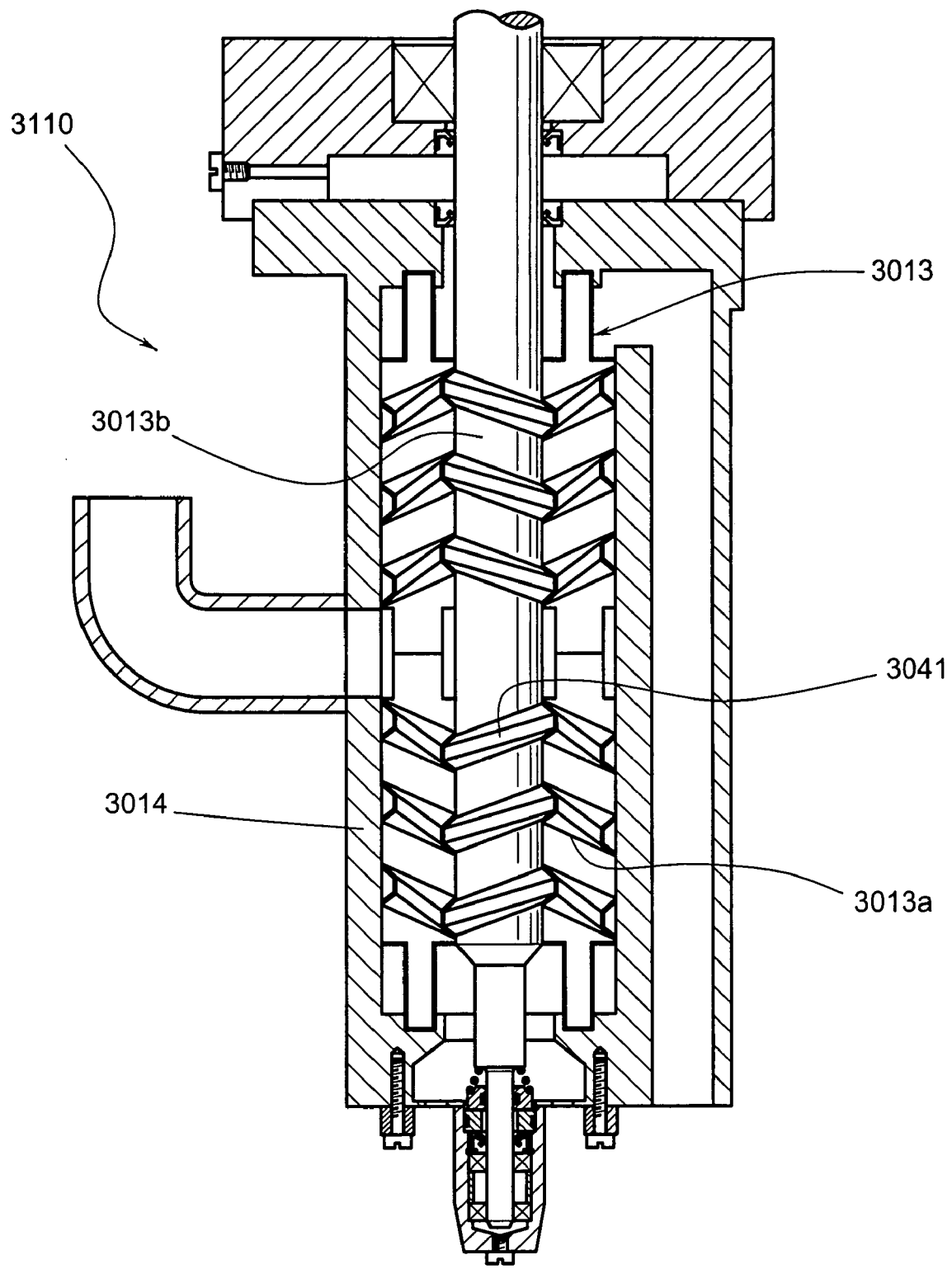
FIG. 16 represents a side section view of a second embodiment of the submerged pump structure.
Figure 17:
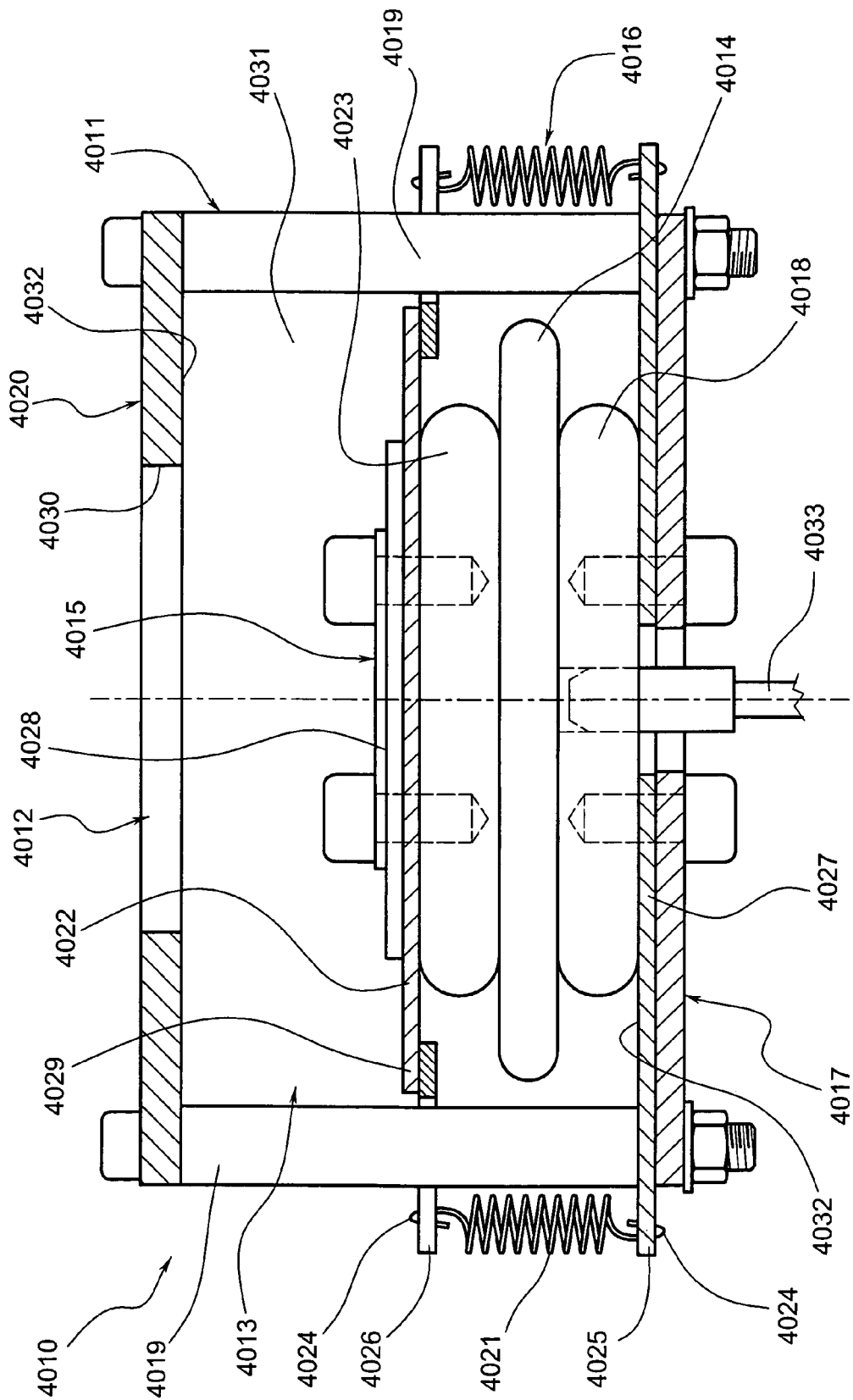
FIG. 17 represents a partial section side view of a pneumatic valve according to the invention, in open position.
Figure 18:
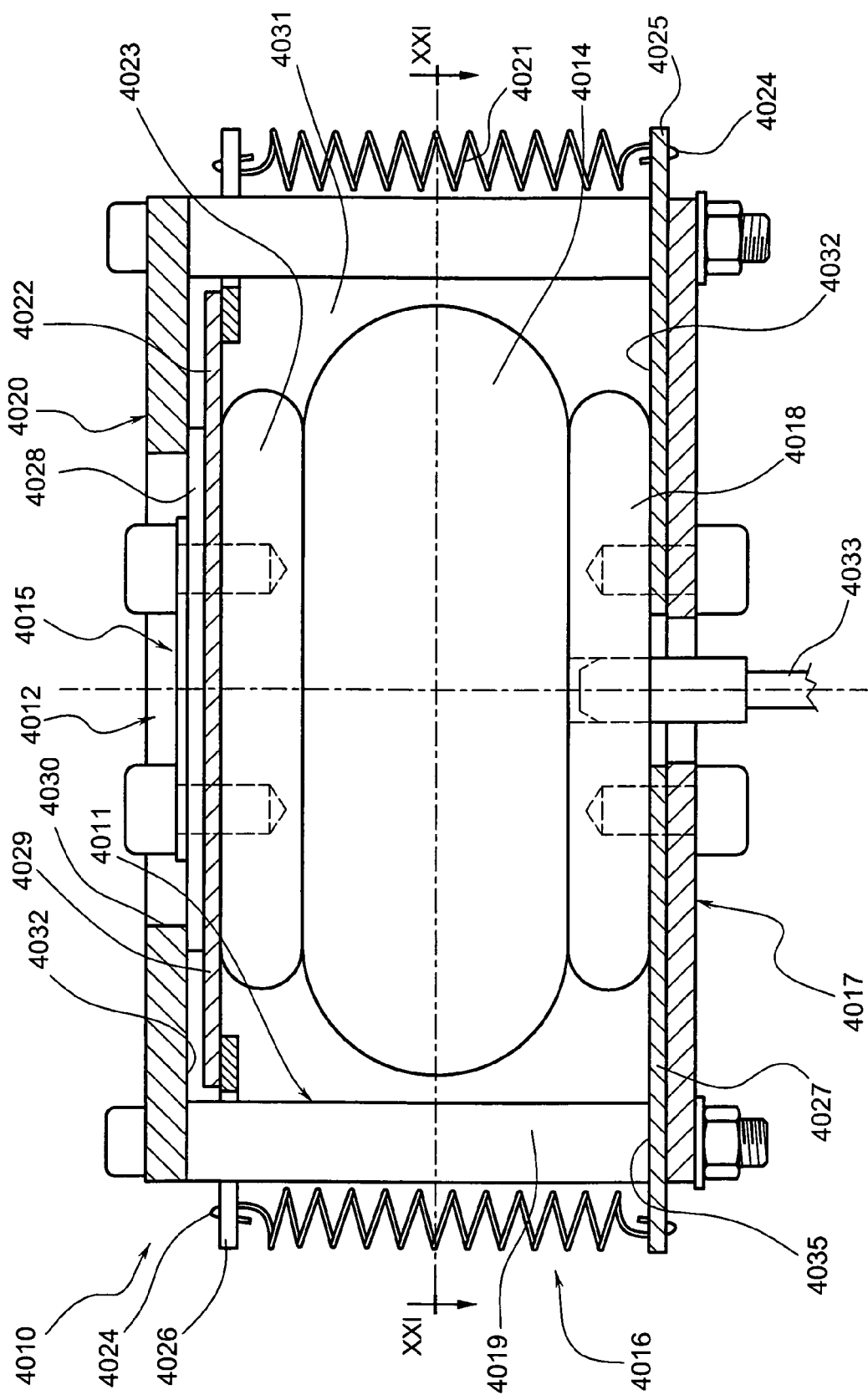
FIG. 18 represents a partial section side view of a pneumatic valve according to the invention, in closed position.

A double suction submerged pump structure with vertical axis according to the invention is disclosed in the FIG. 14 to 16.

It comprises, in a protective containment casing, a rotation shaft on which at least a pair of opposite interfacing impellers is fitted inside a chamber, for said impellers, for conveying the fluid towards a delivery, said shaft being rotatable on rotational sliding means and actuated at the top end by a motor, said shaft also having fluidic sealing means associated with it arranged between said motor and said chamber for the impellers.

Said submerged pump structure has, below said pair of rotating suction elements, a hollow tang, integral with said casing, defining a seat for the bottom end of said shaft, between said shaft and said tang being arranged said rotational sliding means and corresponding further fluidic sealing means positioned between said rotational sliding means and said chamber.

The double suction submerged pump structure in a first embodiment thereof is wholly indicated with reference numeral 3010.

Such a structure 3010 comprises, in a protective containment casing, a rotation shaft 3012 on which a pair of opposite interfacing suction impellers 3013 is fitted inside a chamber 3014, for such impellers 3013, for conveying the fluid towards a delivery 3015.

The shaft 12, actuated at the top end 3016 by a motor (not illustrated for the sake of simplicity), is rotatable on rotational sliding means 3018.

First fluidic sealing means 3038 are associated with such a shaft, arranged between the motor and the chamber 3014.

Such a submerged pump structure 3010 has, below the pair of suction impellers 3013, a hollow tang defining a seat 3020 for the bottom end 3019 of the shaft 3012.

Such a hollow tang is integral with the casing 3011. Between the shaft 12 and the hollow tang 3020 the rotational sliding means 3018 and corresponding second fluidic sealing means 3017 are arranged.

Such second fluidic sealing means 3017 are positioned between the rotational sliding means 3018 and the chamber 3014.

The rotational sliding means 3018 are given by a first lower rolling bearing 3021 and by a second upper rolling bearing 3022, which surround the bottom end 3019 of the rotation shaft 3012.

Such first and second bearings 3021, 3022 are kept in mutual position by a spacer 3023 placed between said bearings 3021 and 3022 and by anti-slip elements arranged below the first bearing 3021 and above the second bearing 3022.

The rotational sliding means 3018 also comprise an oil-blocking ring 3024 suitable for preventing leaking from the seat 3020 inside the hollow tang towards the conveying chamber 3014 of the lubricant in which the bearings 3021 and 3022 are immersed.

The sealing means 3017 are given by a pair of sealing rings interfacing in the axial direction.

A first sealing ring 3025 is inserted in the seat 3020 above the oil-blocking ring 3024 and a second sealing ring 3026 surrounds the rotation shaft 3012.

The second ring 3026 is pressed against the first ring 3025 by elastic means 3027 also integral with the rotation shaft 3012.

Such elastic means 3027 consist of a spring, placed between said second sealing ring 3026 and a first abutment shoulder 3031 of said rotation shaft 3012.

The first abutment shoulder 31 forms part of a small support shaft 3040, which forms the bottom end 3019 of the shaft 3012, and is only ready to work following the assembly of the impellers 3013 on the shaft 3012.

The first and second sealing rings 3025, 3026 are made from widia.

The seat 3020 is made from a cup-shaped element 3028 fixed below the conveying chamber 3014 and open towards it.

The cup-shaped element 3028 is advantageously removable from the chamber 3014, to allow the replacement or repair of the sealing rings 3025 and 3026, of the bearings 3021 and 3022, or of any other component that is accessible by removing such a cup-shaped element 3028.

A variant of the INVENTION (not illustrated) has a cup-shaped element 3028 that forms a single body with the conveying chamber 3014.

The cup-shaped element 3028 has, at its base 3029, an injection hole 3030 for a lubricant for the rotational sliding means 3018.

The anti-slip elements consist of a second shoulder 3032, inside the cup-shaped element 3028, on which the first lower bearing 3021 abuts, and an elastic ring 3033 housed in its own hollow countershape 3034 to block the second upper bearing 3022 at the top.

The submerged pump structure 3010 described here, as stated, has double suction.

A first suction mouth 3035 is open, downwards, on said chamber 3014.

second suction mouth 3036 opens on the side of the protective containment casing 3011, and above the conveying chamber 3014.

The second mouth 3036 has a drawing tube 3037 that allows such a second mouth 3036 to suck up from a height substantially equal to that of the first mouth 3035.

The submerged pump structure 3010 also comprises first fluidic sealing means 3038, which guard the motor from the liquid sucked up, and are arranged on the shaft 3012 near to the motor itself.

The first fluidic sealing means 3038 consist of a pair of oil-blocking rings 3038a and 3038b respectively, that are interfacing and pressed against the shaft 3012 by a volume of pressurised oil 3039 defined by the two oil-blocking rings 3038*a* and 3038*b*.

In such a first embodiment of a submerged pump structure 3010 according to the INVENTION, the interfacing and opposite impellers 3013 consist of two bladed impellers 3013*a* and 3013*b*, respectively.

The chamber 3014 is given by a volute.

According to a second embodiment of the invention, indicated in FIG. 16 by reference numeral 3110, the impellers 3113 consist of two interfacing and opposite Archimedean screws 3113*a* and 3113*b*

In such a second embodiment, the chamber 3114 of the impellers 3113 is given by a tubular body the internal diameter of which substantially coincides with the external diameter of the auger 3141 of the Archimedean screws 3113*a* and 3113*b*.

In practice, it has been noted how the invention thus described solves the problems highlighted in known types of double suction submerged pump structures with vertical axis.

Indeed, in addition to the features of balancing of the axial thrust characteristic of the double suction pump, there are also the advantages of sealing in depression.

In known submerged pumps with vertical axis, indeed, the thrust of the pressure from below onto the impellers, with the second fluidic sealing means and rotational sliding means arranged above the impellers, takes the liquid containing metallic mud to press against such sealing means, causing relatively quick wear thereof.

On the other hand, in the present invention, the second fluidic sealing means 3017 are in a depression zone, from which the liquid with the metal chips is sucked up by the impellers 3013 or 3113.

The arrangement of the sealing means in a depression zone prevents the metal chips from penetrating between the two widia sealing rings 3025 and 3026, prolonging their lifetime and therefore optimally preserving the rotational sliding means 3018 from infiltration.

Therefore, with the present invention a double suction submerged pump structure with vertical axis has been made in which both the sealing means and the rotational sliding means have a longer lifetime and a better yield.

Furthermore, with the present invention a double suction submerged pump structure with vertical axis has been made in which the axial thrusts on the drive shaft are no less balanced than in known double suction pumps with vertical axis.

Moreover, with the present invention a submerged pump structure has been made in which the electric motor is particularly protected from possible leaks.

Such special characteristics are, indeed, obtained thanks to the pair of oil-blocking rings 3038*a* and 3038*b*, which not only also work in depression for the suction carried out by the upper rotating element 3013*b* or 3113*b*, but are also pressed against the shaft 3012 by the volume of pressurised oil 3039.

With the present invention a double suction submerged pump structure with vertical axis has been provided that can particularly be applied to tanks for collecting liquids containing muds from mechanical processing.

Last but not least, with the present invention a double suction submerged pump structure with vertical axis has been made that can be produced with known plants and technologies.

The invention thus conceived can undergo numerous modifications and variants, all of which are covered by the inventive concept.

Moreover, all of the details can be replaced with others that are technically equivalent.

In practice, the materials used, provided that they are compatible with the specific use, as well as the sizes, can be whatever according to requirements and the state of the art.

With reference to the FIG. 17 to 22, a pneumatic valve according to the invention, in a first embodiment, is wholly indicated with reference numeral 4010.

Such a valve 4010 comprises a frame 4011, equipped with a first and second opening 4012, 4013 respectively, one for inlet and one for outlet, for the passage of fluids, generally liquids containing muds from mechanical processing.

Inside the frame 4011 an air chamber 4014 is arranged that, inflating, is suitable for pushing a shutter 4015 against the first through opening 4012.

The air chamber 4014 is arranged sandwiched between compression means 4016, suitable for disengaging the shutter 4015 from the first through opening 4012 in the absence of pressure inside the air chamber 4014 itself.

The frame 4011 is made up of a first plate 4017, to which the air chamber 4014 is fixed through a first fastening ring 4018 coaxial to it.

From the edge 4035 of the first plate 4017 three connection uprights 4019 for the first plate 4017 with a second plate 4020 extend, equally spaced apart.

On such a second plate 4020 there is the first through opening 4012.

The compression means 4016 are given by a plurality of springs 4021 arranged between a compression plate 4022 of the air chamber 4014 and the first plate 4017, to move the compression plate 4022 in the direction of inflation of the air chamber 4014.

The compression plate 4022 is locked to a second fastening ring 4023 coaxial and integral with the air chamber 4014 at the opposite side with respect to the first ring 4018.

The springs 4021 are traction springs and are hooked by their annular ends 4024 to corresponding first projections 4025, integral with the first plate 4017, and symmetrical to corresponding second projections 4026 integral with the compression plate 4022.

The first projections 4025 extend radially from a disc 4027 locked between the first plate 4017 with which it is integral and the first fastening ring 4018.

In the same way, the second projections 4026 extend radially from the compression plate 4022.

The shutter 4015 is defined by a thickness of rubber 4028 with a section no smaller than the section of said first through opening 4012.

Such a thickness of rubber 4028 is integral with the face 4029 of the compression plate 4022 facing towards the first through opening 4012.

The first through opening 4012 is given by a circular through hole 4030 obtained on the second plate 4020.

The second through opening 4013 consists of the open areas 4031 defined by two uprights 4019 consecutive with the inner surfaces 4032 of the first and second plates 4017, 4020.

The first plate 4017 has a connection nozzle 4033 for the compressed air ducts 4034 for inflating the air chamber 4014.

Such a valve 4010 is closed if pressurised air is blown into the air chamber 4014.

The blowing of air causes the air chamber 4014 to inflate, which, lifting up, overcomes the force of the springs 4021 and pushes the thickness of rubber 4028 to block the first opening 4012.

When the pressure in the air chamber 4014 is interrupted, the force of the traction springs 4021 squashes the air chamber 4014 making the air flow out from it, and thus deflating it.

In this way the first through opening 4012 is opened and it is made possible for liquid to pass between them and then through the open areas 4031 that define the second opening 4013.

The flow of liquid through the first and second openings 4012, 4013 is of course allowed in both directions.

A valve 4010 according to the invention can be controlled through compressed air, and does not have electrical or electronic components that can easily be damaged, above all if constantly inserted in a wet area like a decanting tank or similar.

Figure 22:
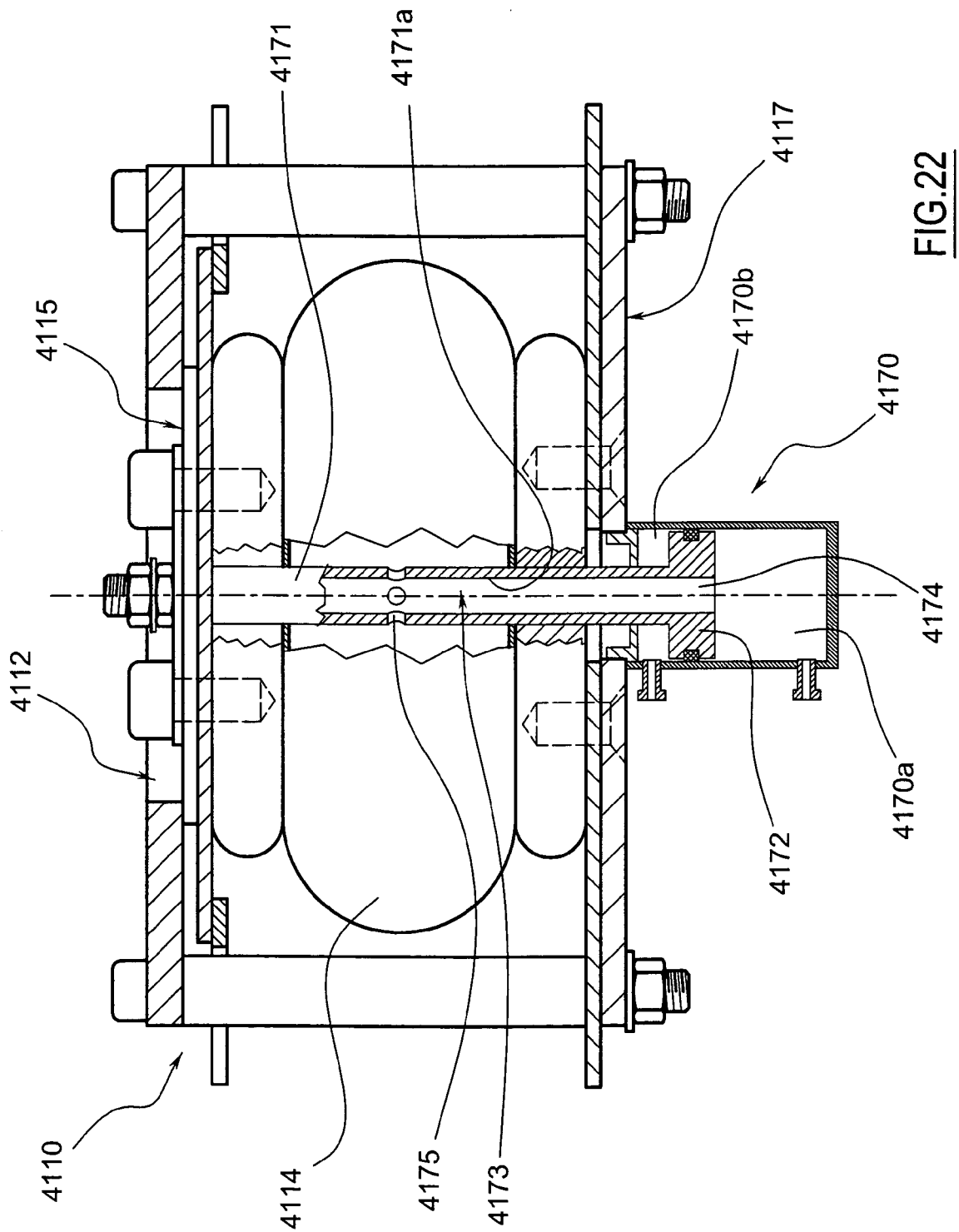
FIG. 22 illustrates a partial section side view of a pneumatic valve according to the invention in a second embodiment thereof.
Figure 23:
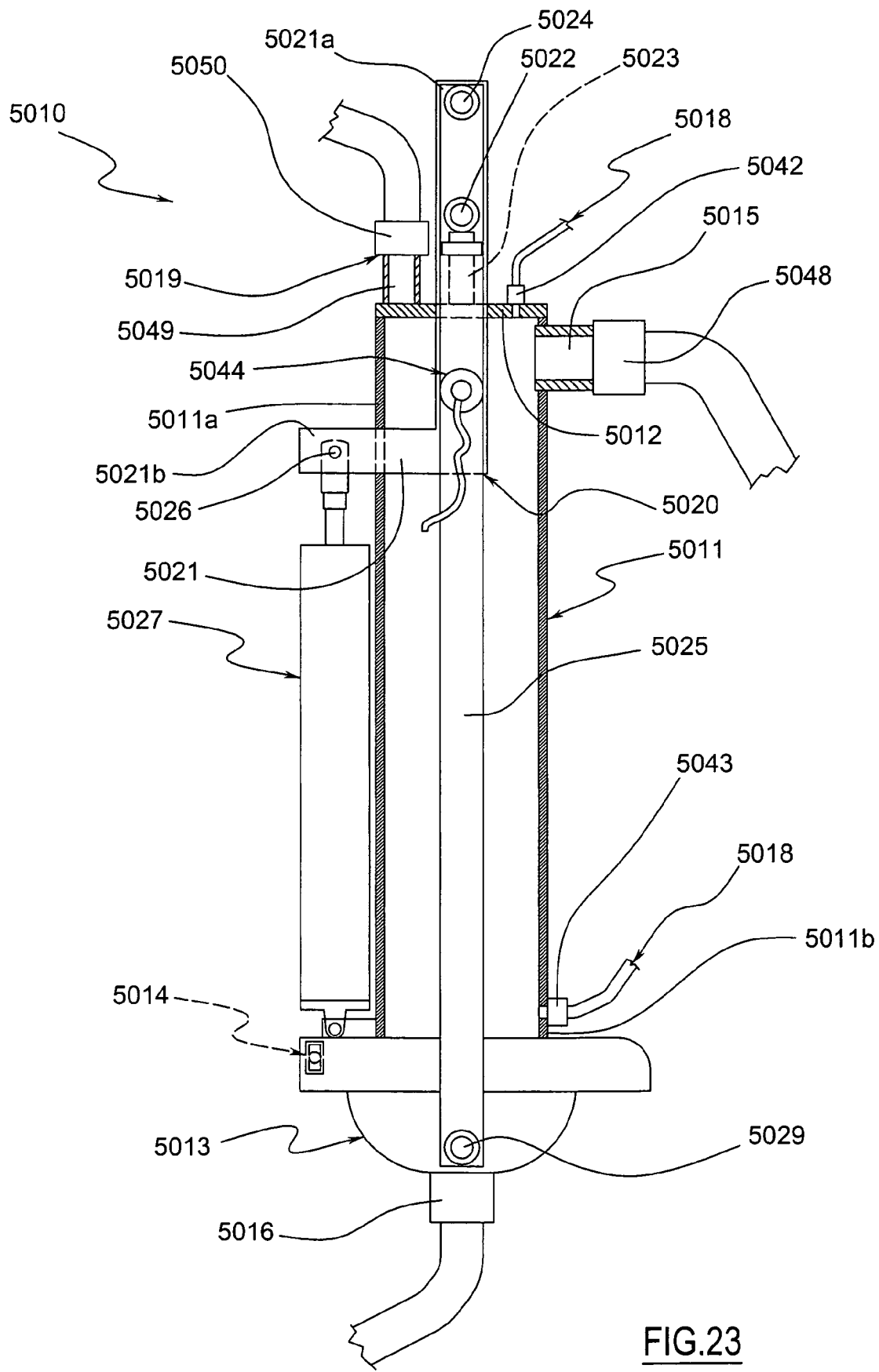
FIG. 23 represents a side partial section view of a discharge device according to the invention in position with base plate closed.
Figure 24:
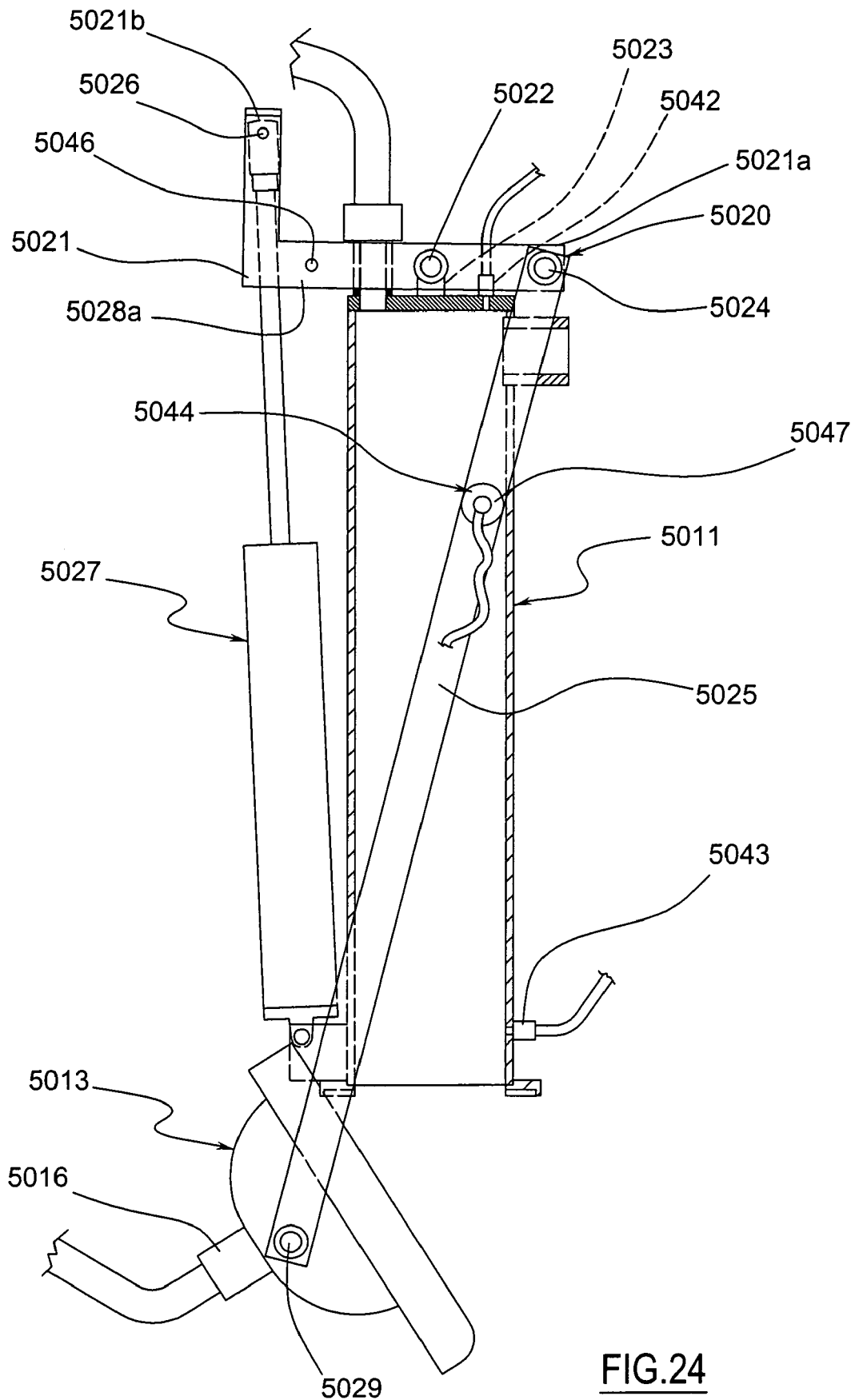
FIG. 24 represents the same view as FIG. 23 in position with the base plate open.
Figure 25:
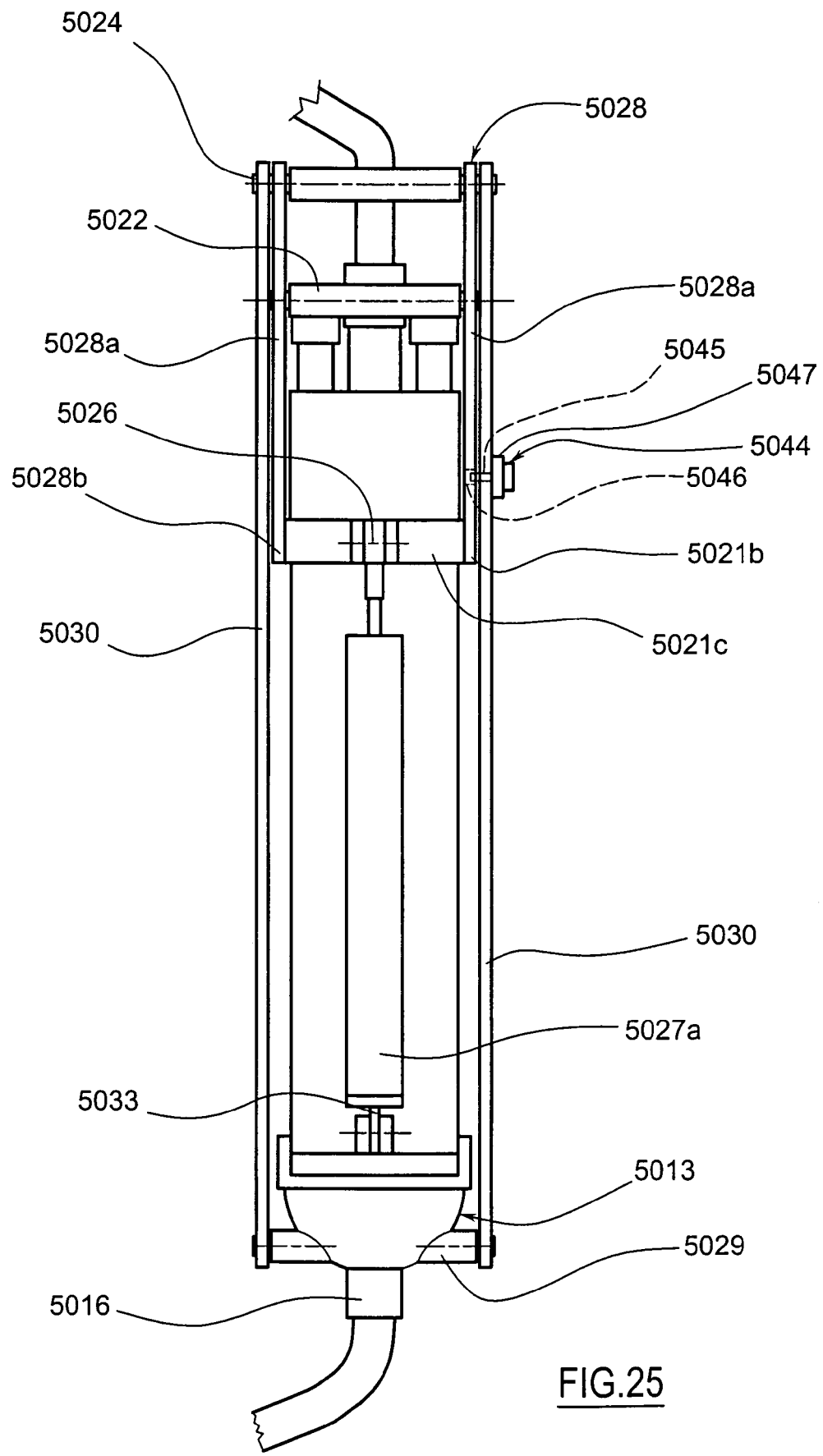
FIG. 25 represents a front view of a device according to the invention.
Figure 26:
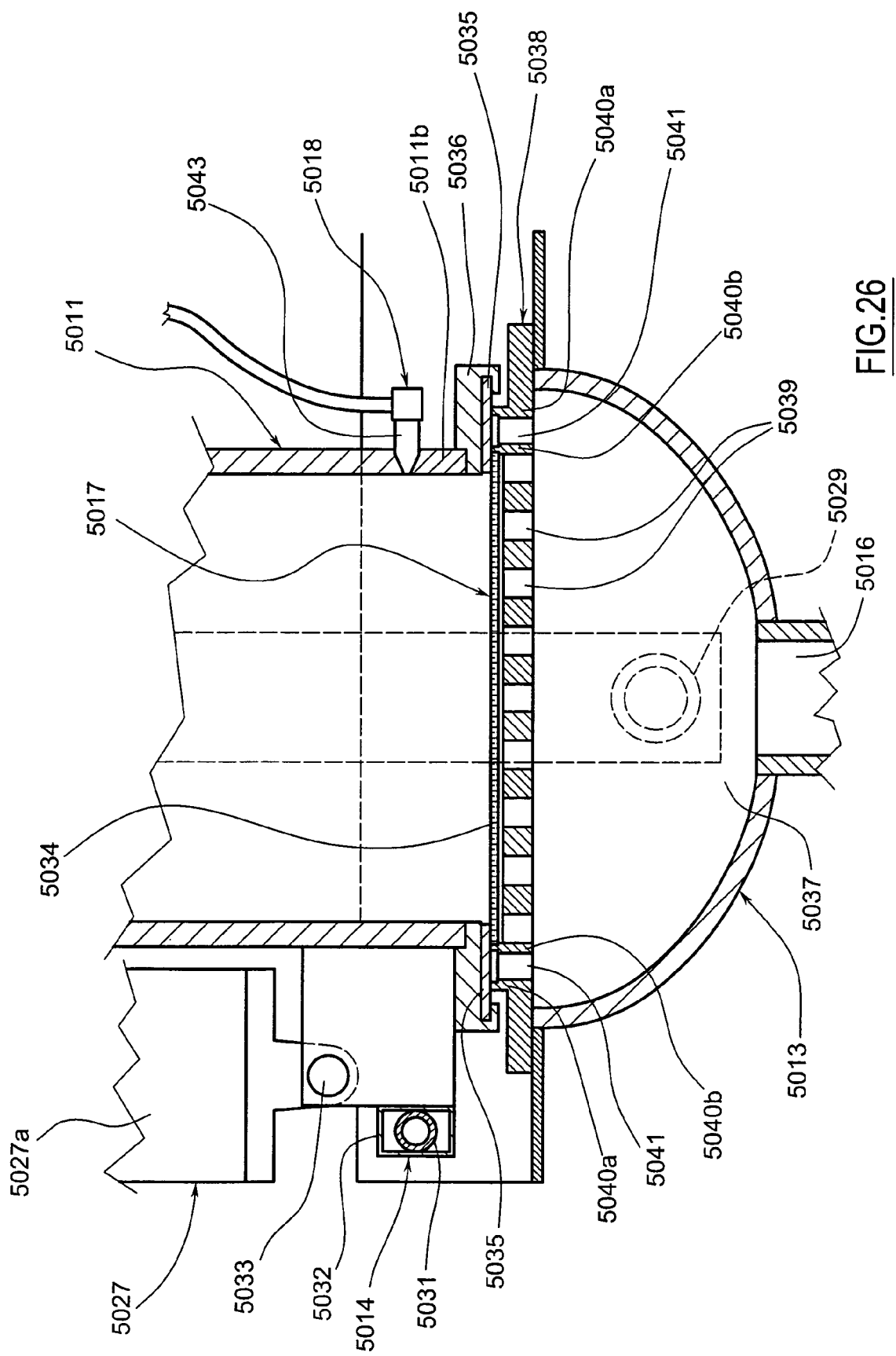
FIG. 26 represents a side section view of the base plate, in closing position, of a device according to the invention.
Figure 27:
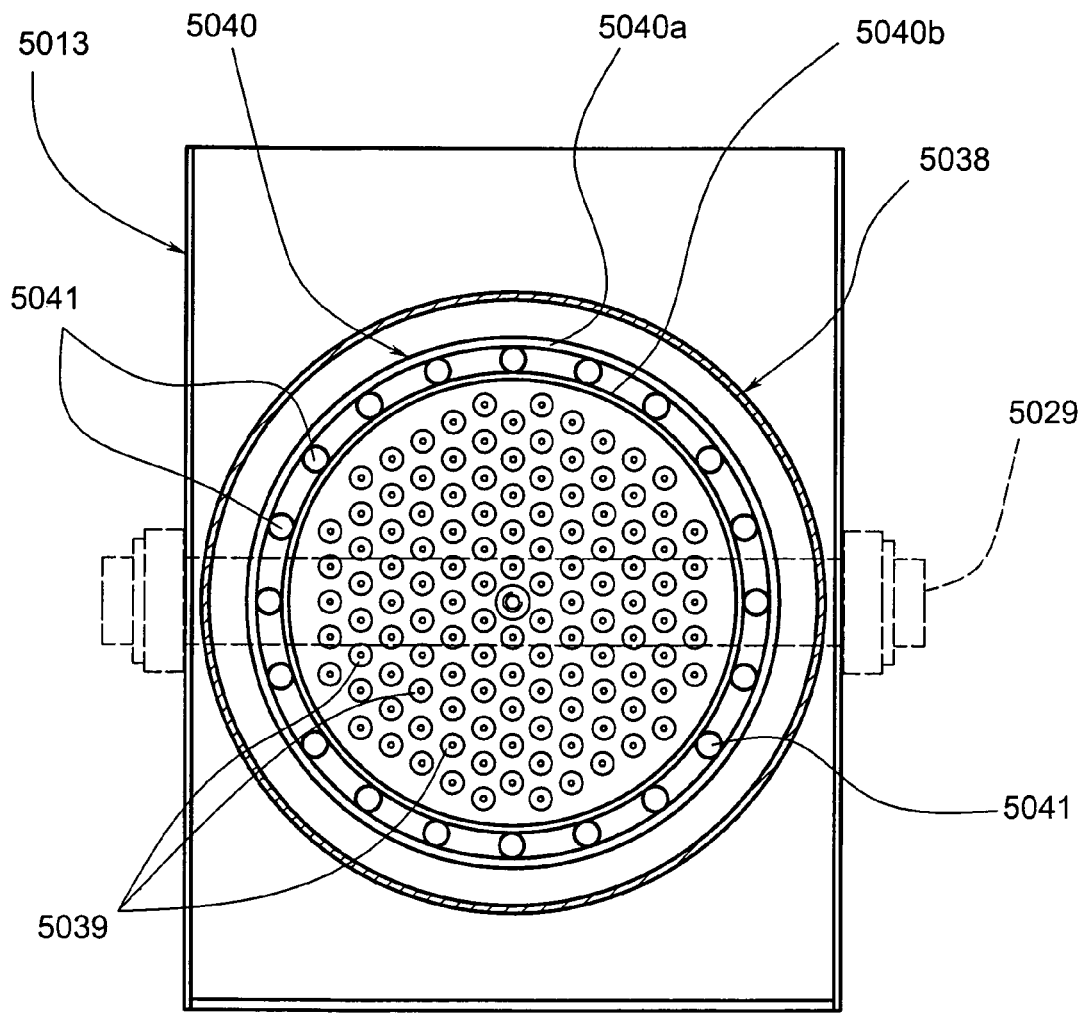
FIG. 27 illustrates a view from above of said base plate.
Figure 28A:
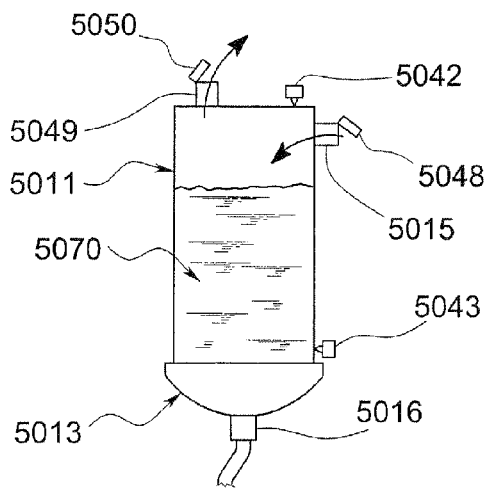
FIGS. 28a to 28f schematically represent a use process of the device of FIG. 23.
Figure 28B:
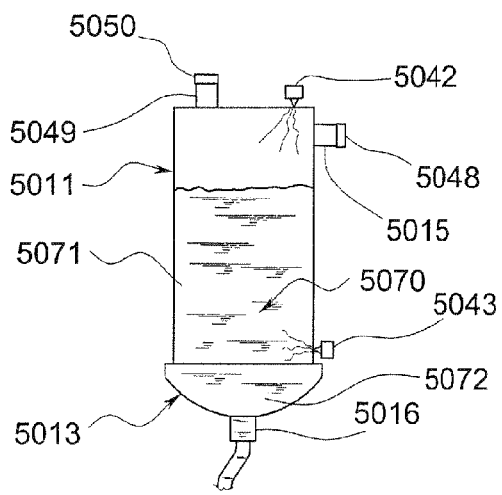
Figure 28C:
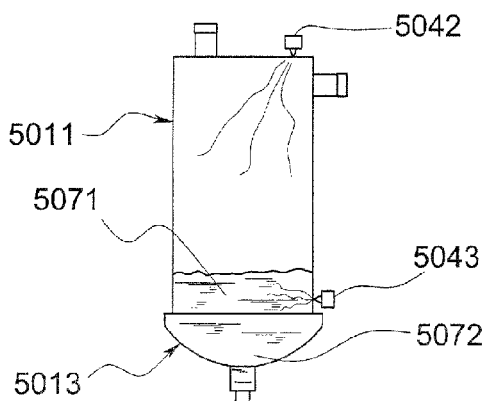
Figure 28D:
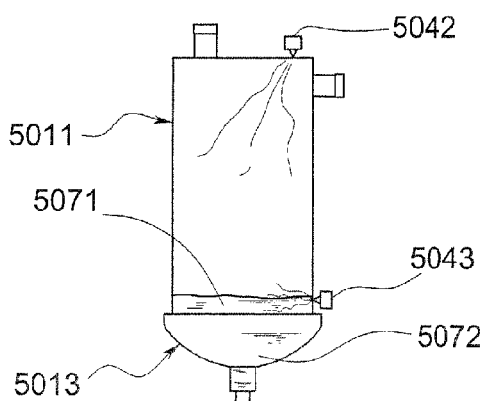
Figure 28E:
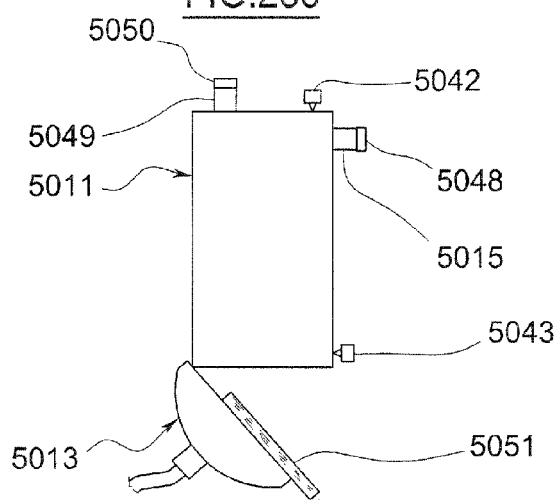
Figure 28F:
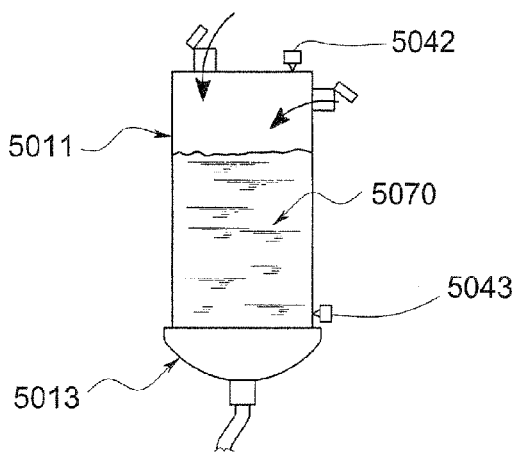

A pneumatic valve according to the invention in a second embodiment is indicated in FIG. 22 with reference numeral 4110.

Such a valve 4110 is characterised in that the compression means 4116, suitable for disengaging the shutter 4115 from the first through opening 4112, are given by a pneumatic piston 4170, fixed to the first plate 4117 and with its stem 4171 fixed to the shutter 4115 for moving the latter.

The piston 4170 is arranged with its stem 4171 substantially coaxial to the air chamber 4114, to act in traction on the shutter 4115 connected to it and in compression on said air chamber 4114.

The cylinder 4172 of the piston 4170, indeed, defines a thrusting chamber 4170a and a traction chamber 4170b.

By blowing pressurised air into the traction chamber 4170b the cylinder 4172 is moved away from the first plate 4117 and consequently there is a traction force, through the stem 4171, on the shutter 4115, which is pulled back towards the first plate 4117, thus opening the first opening 4112.

The stem 4171 and the cylinder 4172 of the piston 4170 from which it extends advantageously have passages 4173 for a pressurised air flow coming from the piston 4170 and aimed towards the inside of the air chamber 4114.

Such passages 4173 consist of a first through hole 4174 on the cylinder 4172, from which cylinder 4172 extends a substantially tubular stem 4171a coaxially to the first hole 4174.

Such a tubular stem 4171a has second connection holes 4175 of the thrusting chamber 4170a of the piston 4170 with the air chamber 4114.

The passages 4173 for the pressurised air allow a further function to be obtained from the piston, in addition to that of disengaging the shutter 4115 from the first opening 4112, which is that of increasing the closing force of the shutter 4115 on such a first opening 4112 itself.

Indeed, by injecting pressurised air into the thrusting chamber 4170a, the shutter 4115 is pushed both through the action of the air chamber 4114, inflated through the passages 4173, and through the additional action of the stem 4171, pushed by the cylinder 4172 in turn subjected to the same pressure that allows the air chamber 4114 to be inflated.

Figure 19:
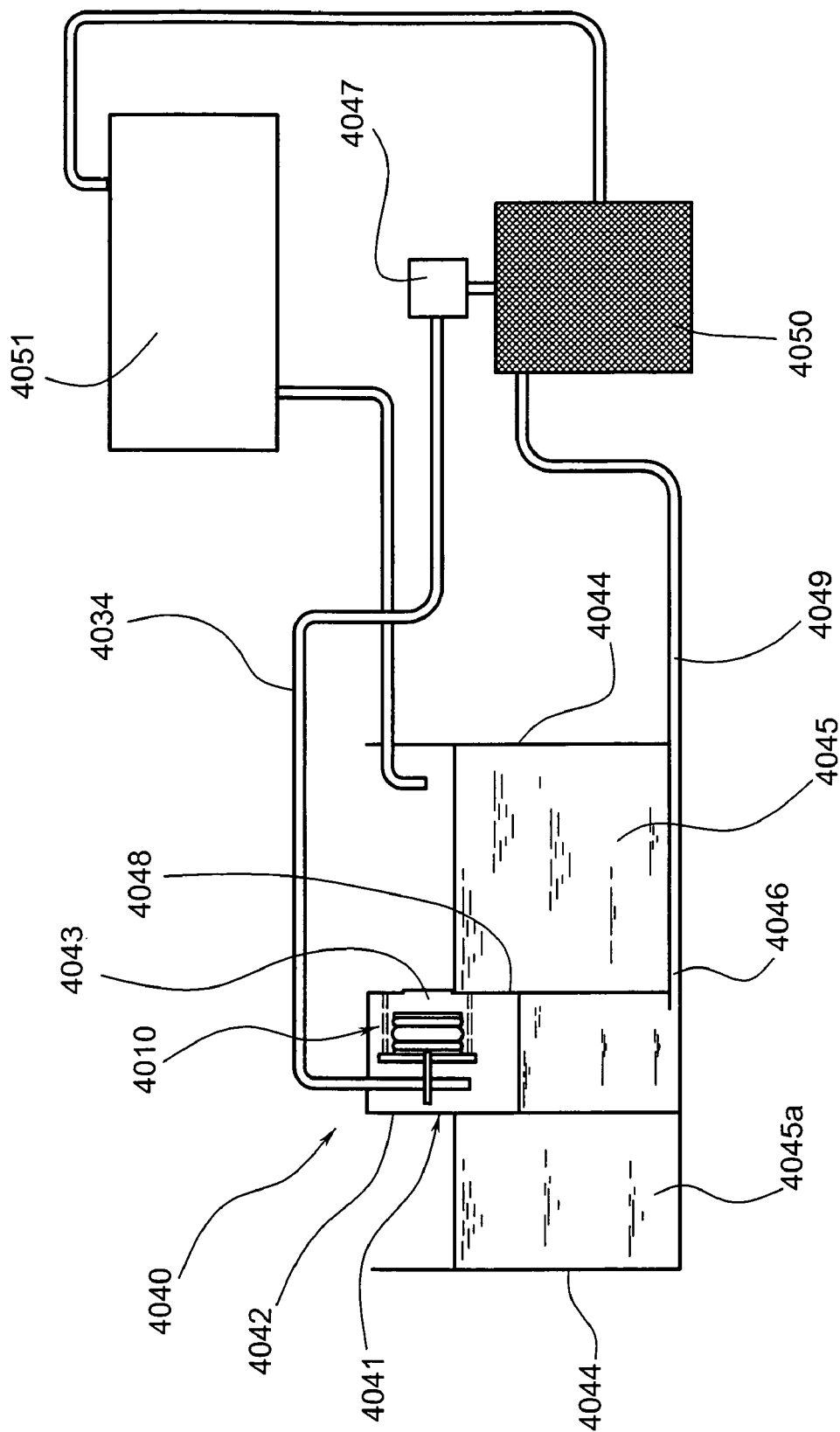
FIG. 19 represents a distribution device of liquids containing muds from metallic processing according to the invention.

Also forming the object of the invention is a distribution device of liquids, indicated in FIG. 19 with reference numeral 4040.

Such a device 4040 consists of a box-shaped body 4041, equipped in its top part 4042 with an inlet mouth 4043 open on a tank 4044 for liquids 4045, which, in the present example, should be considered as containing muds from metallic processing.

The tank 4044 is thus for decanting such liquids 4045 containing metallic muds.

In the lower part of the box-shaped body 4041 there is a discharge mouth 4046 for the liquid 4045a contained therein.

A pneumatic valve 4010 as described above is applied to the inlet mouth 4043.

Such a valve 4010 regulates the opening/closing of the inlet mouth 4043.

The device 4040 comprises compression means 4047 of the air for closing the inlet mouth 4043 through the pneumatic valve 4010.

Such compression means 4047 are also suitable for blowing pressurised air into the upper part 4042 of the box-shaped body 4041.

The air blown into the upper part 4042 of the box-shaped body 4041 makes the liquid 4045a inside the box-shaped body 4041 flow out from the discharge mouth 4046.

In the device 4040 described here, the second plate 4017 of the valve 4010 consists of a wall 4048 of the box-shaped body 4041.

The pneumatic valve 4010 is arranged inside the box-shaped body 4041.

In a variant embodiment of such a distribution device 4040 (not illustrated for the sake of simplicity), the valve 4010 is arranged outside the box-shaped body 4041.

By actuating the air compression means 4047, the valve 4010 is closed and the liquid 4045a containing metallic muds flows out from inside the box-shaped body 4041, through a duct 4049, towards a filtering plant 4050.

The liquid 45a enters into the device 4040 by overflowing from the decanting tank 4044.

Such a liquid 4045a comes from the liquid with muds 4045 discharged from the mechanical processing machines, generically indicated with reference numerals 4051, 4051a and so on, and it is already summarily purified through the decanting to which it is subjected in the tank 4044.

When the level of liquid 4045a reaches the inlet mouth 4043, such a mouth 4043 is closed through the valve 4010, and the liquid 40045a is made to flow out through pressurised air.

The filter 4050 thus receives the liquid 4045a that contains less metallic muds with respect to the liquid with muds 4045.

Figure 20:
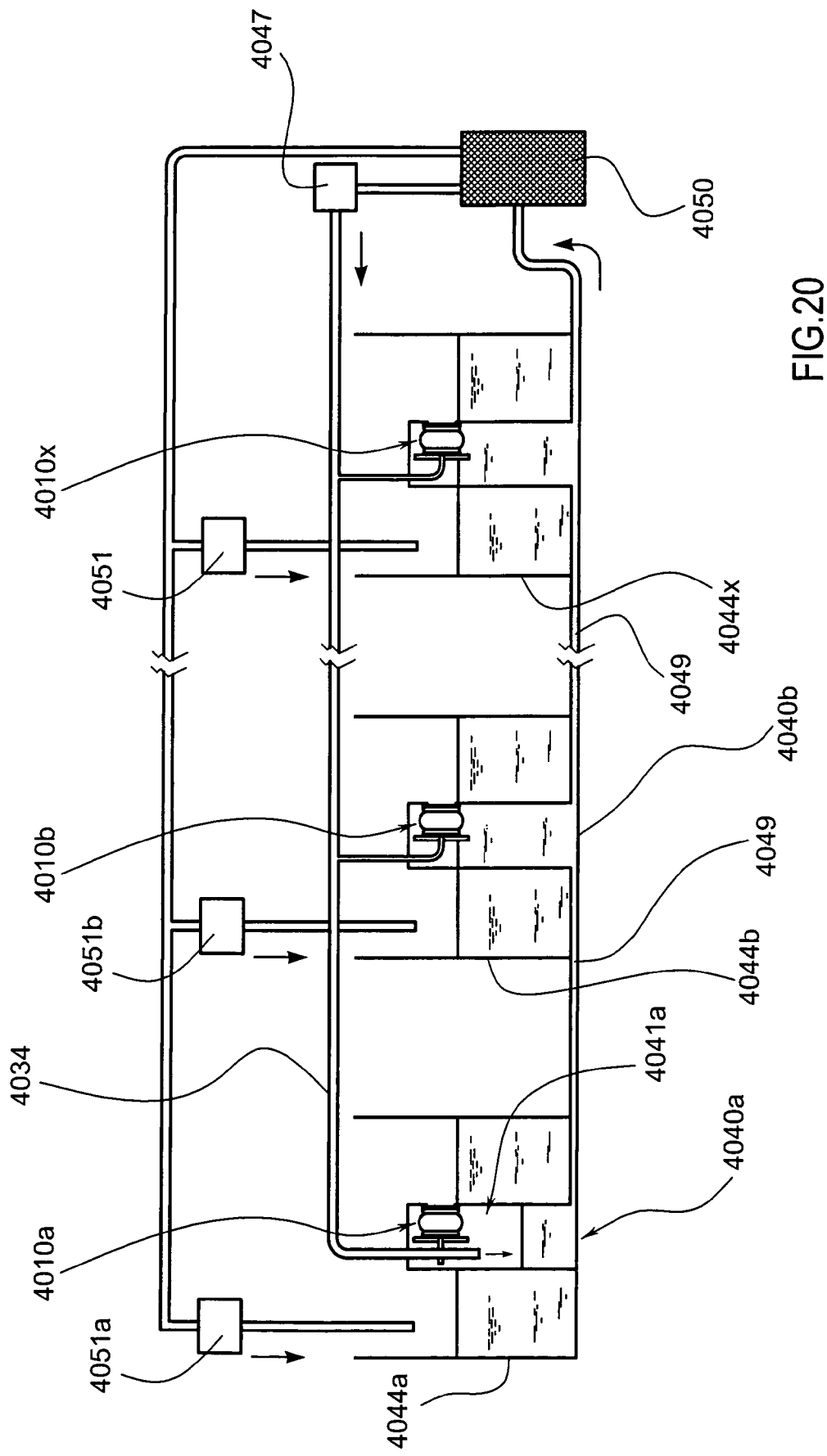
FIG. 20 represents a variant embodiment of a distribution device of liquids containing muds from metallic processing according to the invention.
Figure 21:
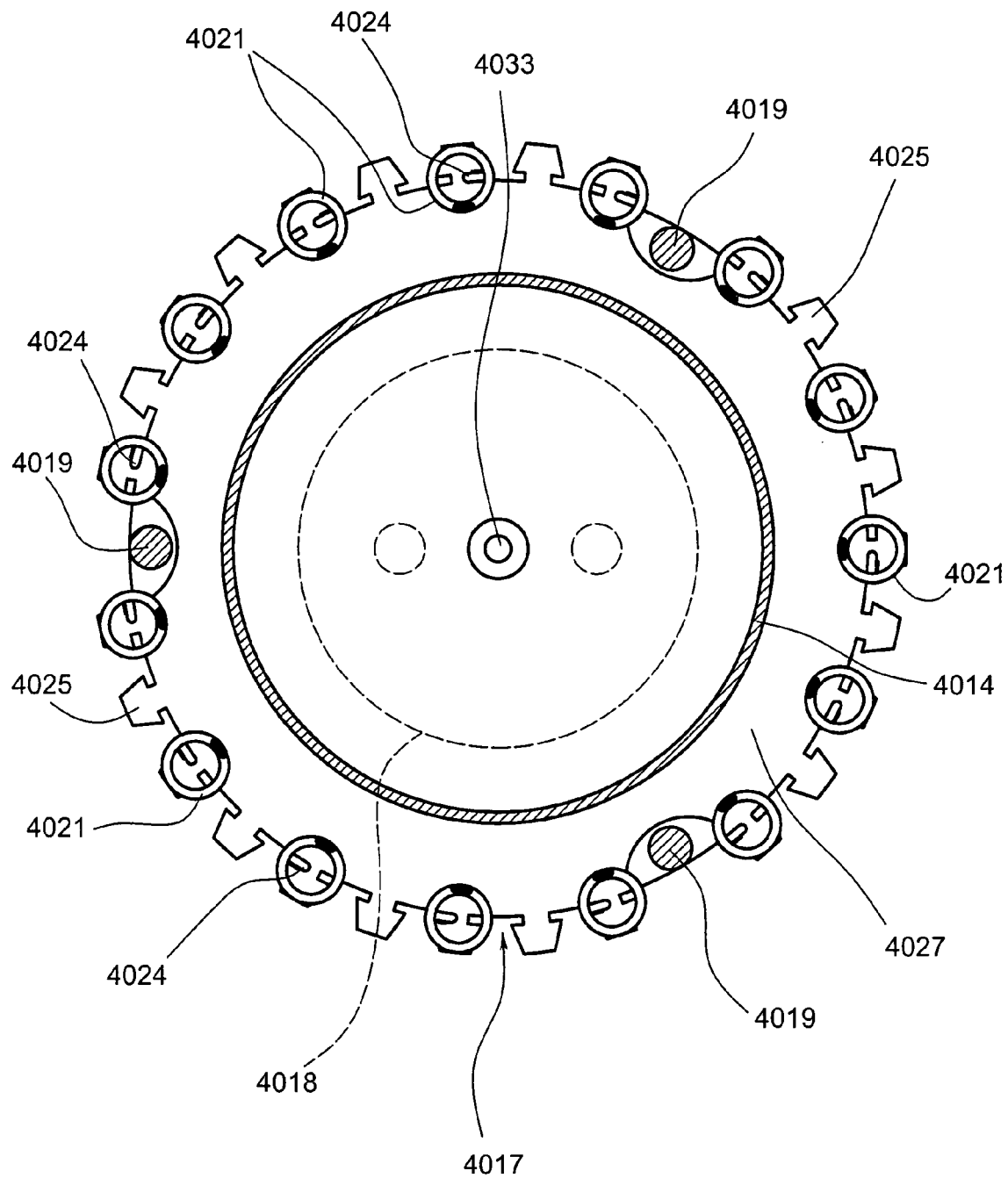
FIG. 21 illustrates a section view from above of a pneumatic valve according to the invention.

As illustrated as an example in FIG. 20, it is possible to arrange a plurality of such devices 4040a, 4040b, 4040x in series, each in a corresponding decanting tank 4044a, 4044b, 4044x, supplied by the respective mechanical processing machine 4051a, 4051b, 4051x.

In such a configuration in series it is necessary to send pressurised air to all of the valves 4010a, 4010b, 4010x, but it is sufficient, for the evacuation of the liquid 4045, to pressurise just the box-shaped body 4041a.

In practice, it has been noted how the invention thus described solves the problems highlighted in known types of valves adopted in evacuation, filtration and recirculation plants of liquids containing muds from mechanical processing.

In particular, with the present invention a pneumatic valve has been made that wears down somewhat less from the passage of metallic muds from mechanical processing with respect to known valves.

Furthermore, with the present invention a pneumatic valve has been made that can easily be managed without electrical or electronic management and control means.

Moreover, with the present invention a distribution device of liquids containing muds from metallic processing comprising at least one pneumatic valve as described in the present invention, and therefore able to be controlled without the use of electrical management and control means, has been provided.

Furthermore, with the present invention a distribution device of liquids containing muds from metallic processing has been provided that can also easily be applied to known plants that are already in operation.

With reference to the FIG. 23 to 28f, a separating and recovery device of liquids from muds from mechanical processing according to the invention, is wholly indicated with reference numeral 5010.

Such a device 5010 consists of a tubular container 5011 closed at the top by a cover 5012 and at the bottom by an openable filtering and discharge base plate 5013.

The base plate 5013 is hinged to the container 5011 through articulation means 5014 described better later on.

The container 5011 is fed through an inlet mouth 5015 open on the high part 5011a of the container 5011 itself.

The muds, which in the Fig.s are indicated with reference numeral 5070, are picked up from a mud-collection tank.

The base plate 5013 is equipped with a lower outlet channel 5016 for the liquids 5072 extracted from the muds 5070, and with a filtering element 5017 suitable for holding the solid part 5071 of the muds 5070 at the lower end section 5011b of the container 5011.

The device 5010 has means for raising the pressure 5018 inside the container 5011.

Such means for raising the pressure 5018 compress the muds 5070 towards the filtering element 5017, as explained better later on.

Air venting means 5019 are also present, again on the high part 5011a of the container 50011, which allow air (and possible overloads of liquid) to escape from inside the container 5011 when the muds 5070 are introduced into it.

The device 5010 also comprises moving means 5020 for opening/closing the base plate 5013.

The moving means 5020 of the base plate 5013 consist of an interfixed or first type of lever 5021, the pivot 5022 of which, with a horizontal axis, is supported by supports 5023 rising from the upper cover 5012.

The lever 5021 is firmly connected at a first end 5021a with a first turning pair 5024 to a tie rod 5025 for opening/closing the base plate 5013, and at the second end 5021b, with a second turning pair 5026, to actuation means 5027 in turn hinged to the container 5011.

The tie rod 5025 is rotatably fixed to the base plate 5013 with a third turning pair 5029.

The lever 5021 consists of a pair of first rods 5028 arranged symmetrically on two opposite sides of the container 5011.

Each of such first rods 5028 is substantially L-shaped, with the vertical portion 5028a in closing position for the base plate 5013, substantially interfacing with the tie rod 5025.

The second ends 5021b of the first rods 5028 are rigidly fixed through a crosspiece 5021c, which carries the connection turning pair 5026 with the actuation means 5027.

In the same way, the tie rod 5025 is given by two second rectilinear rods 5030, hinged as described each to the adjacent first rod 5028.

Advantageously, when the base plate 5013 is in closed position, the axes of the pivot 5022 and of the first and third turning pairs 5024, 5029, which are parallel to each other, lie substantially on the same plane perpendicular to the base plate 5013 itself.

Just as suitably, such a plane perpendicular to the base plate 5013 is symmetrical with the container 5011.

In this way, with the base plate closed, when the container 5011 is under pressure, the force applied by the internal pressure on the base plate 5013 cannot substantially generate any moment suitable for opening the base plate 5013, due to the lack of an arm that leads to the generation of such a moment.

The vector of the pressure force, indeed, lies on the perpendicular plane defined previously, containing the rotation axes of the pivot 5022 and of the first and third turning pairs 5024, 5029.

Such a structure of moving means 5020 advantageously implies greater safety of use of the device 5010.

Indeed, even without force from the actuation means 5027, the vertical alignment of such rotation axes, together with the reciprocal position of the lever 5021 and of the tie rod 5025, prevents the base plate 5013 from opening accidentally.

Another important provision concerns the supports 5023 rising from said cover 5012.

Such supports 5023 are height-adjustable.

The adjustment of the supports 5023 allows the clamping force of the base plate 5013 to be varied according to requirements.

This is allowed by the fact that said articulation means 5014 for the base plate 5013 consist of a pin 5031 arranged to roto-translate in a guide 5032 integral with the container 5011.

In this way the pin 5031, with its axis parallel to the rotation axes of the pivot 50022 and of the first and third turning pairs 5024, 5029, is able to follow the vertical displacement set by the height-adjustment of the supports 50023.

The guide 5032 is in the form of a profile with rectangular section, welded on the back of the container 5011, substantially at the hinging 5033 of the actuation means 5027.

Such actuation means 5027 are in the form of a double acting pneumatic actuation cylinder 5027a.

The filtering element 5017 is given by a sieve 5034 with a surface such as to cover at least the entire lower end section 5011b of the container 5011.

Such a sieve 5034, made from nylon or metallic mesh, is integral with the base plate 5013.

The sieve 5034 is pressed by the base plate 5013 in closed position against an annular gasket 5035 with which the lower edge 5036 of the container 5011 is equipped.

The base plate 5013 has a collection basin 5037 for the liquids 5072 coming from the compression of the muds 5070.

The basin 5037 is open on the outlet channel 5016, which takes the liquids 5072 to the circulation tanks.

Above such a basin 5037 the base plate 5013 has a dividing wall 5038 equipped with a plurality of first discharge holes 5039 arranged at the sieve 5034.

Such first holes 5039 are distributed inside a ring 5040 of second discharge holes 5041 arranged at the annular gasket 5035, such a ring 5040 being integral with the dividing wall 5038 and therefore with the basin 5037.

The sieve 5034 is locked above the first holes 5039 inside the ring 5040.

The concentric edges 5040a and 5040b, pressed against said gasket 5035, define two sealing barriers suitable for preventing the pressurised muds 5070 from escaping. The means for raising the pressure 5018 consist of a plurality of first air-injectors 5042, only one of which is illustrated as an example in the Fig.s.

Such first injectors 5042 are arranged to blow air inside the container 5011 from the cover 5012 of the container 5011 itself.

The injection of air into the container 5011 causes the pressure to rise, which is necessary to push the muds 5070 onto the sieve 5034 of the closed base plate 5013.

The means for raising the pressure 5018 comprise at least one second air injector 5043 close to the lower end section 5011b of the container 5011.

Such second injectors 5043 remix the layer made up of the solid part 5071 of the muds 5070, a layer that is in the process of solidifying on the sieve 5034.

Such a layer, indeed, tends to still hold liquid 5072, and during solidification on such a layer preferential passages for the air coming from the first injectors 5042 form, which, having run-off channels, no longer carries out the liquid-solid separation operation for which it is injected.

At this point the second injectors 5043 are activated, which remix the solidifying layer, preventing the formation of run-off channels for the air and improving the separation of the liquids 5072 from the muds 5070, and therefore at the same time the cleaning of the solid part 5071.

Advantageously, the device 5010 has a safety locking device 5044 suitable for reversibly locking the lever 5021 to the tie rod 5025 in closed position of the base plate 5013.

Such a locking device 5044 is pneumatically actuated, and is in the form of a pin 5045, the housing 5047 of which is fixed on one of the second rods 5030.

The pin 5045 is pushed/withdrawn in a countershaped hole 5046 on the adjacent vertical portion 5028a of the first rod 5028.

The inlet mouth 5015 has opening/closing means 5048 suitable for adjusting the amount of muds 5070 poured in the container 5011.

The venting means 5017 consist of a venting mouth 5049, open on the cover 5012 and are equipped with second opening/closing means 5050.

Such first opening/closing means 5048 for the inlet mouth 5015, just like the second opening/closing means 5050 for the venting mouth 5049 are given by a pneumatically actuated valve.

It is extremely advantageous to be able to manage a device 5010 according to the INVENTION through a compressed air circuit (not illustrated for the sake of simplicity), an advantage that can be obtained thanks to the fact that the means for raising the pressure 5018, the actuation means 5027, the first and second opening/closing means 5048 and 5050 and the safety locking device 5044 are pneumatically actuated.

This allows great savings in terms of actuators moved electrically and therefore in terms of electronic components intended for the management of such electrical moving.

A process for separating the solid part from the liquids of muds from mechanical processing, through a device 5010 as described up to now, is illustrated in FIG. 28a to 28f and can be schematised as follows:

closing the base plate 5013 of the container 5011;
opening the inlet mouth 5015 and the venting mouth 5049;
filling the container 5011, through the inlet mouth 5015, with a predetermined amount of muds 5070, allowing the air present in the container 5011 to escape through the open venting mouth 5049;
closing the inlet mouth 5015 and the venting mouth 5049;
starting to inject compressed air inside the container 5011 through the first air-injectors 5042 arranged on the cover 5012.

The muds start to become denser on the sieve 5034, forming a layer that itself becomes a further, finer filter for the muds above.

The metallic chip powder that remains in the liquid, indeed, to a large extent comes from the initial step of the compression of the muds, in which the deposits on the sieve are scarce and the finest metallic chip powder is substantially free to slip through the sieve.

When the layer of solid part 5071 starts to solidify and the run-off channels for compressed air form, the second air injectors 5043 are activated and it proceeds as follows:

remix the muds 5070 in the process of coagulating with the injection of compressed air through the second air injectors 5043 arranged close to the lower end section 5011b of the container 5011;
after a predetermined time period, considered optimal for the best solid-liquid separation, open the base plate 5013 and discharge the tile 5051 of metallic chips formed on the sieve 5034;
reclose the base plate 5013 and reopen said inlet and venting mouths 5015 and 5049 for a new cycle.

The tiles 5051 are, for example, collected in a trolley (not illustrated) and taken to be melted down in a blast-furnace.

Alternatively, a tile 5051 can be left inside the container 5011 for further liquid separation and recovery cycles, also as an auxiliary filter for the sieve 5034.

After such further cycles the tile 5051 thickens.

When it has reached a certain maximum thickness, or else after a certain number of cycles, the tile 5051 is disposed of through the opening of the base plate 5013. The recovered liquid 5072, as stated, is sent back to the circulation tanks that serve the machine tools.

Such a process can advantageously be timed, giving each step a predetermined length.

Such a device 5010 according to the invention allows over 90% of the cooling liquid contained in the muds 5070 to be recovered, compared to 60-70% in known apparatuses and plants.

The invention claimed is:

1. A plant for treating leftover liquids of mechanical processing, comprising:
    at least one chamber (6) that is divided into two parts (a) and (b) by a filtering partition (9); wherein:
        part (a) includes an inlet for entry of a liquid to be filtered;
        part (b) includes an outlet for exit of a filtered liquid;
    vibratory means for causing a vibratory state in at least part (b) of the chamber for the exit of the filtered liquid;
    wherein said vibratory means comprises a pressurized pneumatic system pneumatically connected to part (b) of the chamber to create intermittent pneumatic pressure impulses in at least part (b) of the chamber;
    said pressurized pneumatic system comprising a compressed air source, a compressed air delivery duct, and a piloted open-close valve in the delivery duct;
    an alternative part of said chamber intended for the alternative entry of the liquid to be filtered and of the washing liquid of the partition;
    wherein said alternative part comprises a decanting tank (1012) having a substantially arc of circumference shaped section supplied by at least one entry mouth (1013) for muds, and equipped with at least one outlet mouth (1014) arranged above said entry mouth for the liquid (1050) at least partially separated from the mainly solid residue (1051), there being, inside said decanting tank (1012), means (1016) for picking up the mainly solid residue (1051) decanted from the bottom (1015) of the tank (1012) up to discharge means (1017) for said mainly solid residue (1051).

2. Plant according to claim 1, wherein said pick-up means (1016) from the bottom (1015) of the decanting tank (1012) comprise a rotation device (1018) for at least one scraping blade (1019), said at least one blade (1019) being connected through at least one paddle (1020) to said rotation device (1018), said blades (1019) being suitable for lifting the mainly solid residue (1051) deposited on the bottom (1015) up to said discharge means (1017).

3. Plant according to claim 2, wherein said rotation device (1018) comprises a rotation shaft (1021) to which said paddles (1020) of said scraping blades (1019) are integrally fixed, said shaft (1021) having a gear wheel (1022) with saw teeth (1022a, 1022b, 1022c) in turn fixed integrally to it, said gear wheel (1022) being actuated by a ratchet gear (1023) the movement of which is managed by a device (1024) for generating alternative motion, said ratchet gear (1023) also comprising an antireturn sprag (1025) for said gear wheel (1022).

4. Plant according to claim 3, wherein said device (1024) for generating alternative motion comprises two opposite pneumatic valves (1026, 1026a, 1026b) between which a thrusting pawl (1027) for said gear wheel (1022) is sandwiched.

5. Plant according to claim 2, wherein said discharge means (1017) consists of a removal element (1030) moved by a further device (1031) for generating alternative motion and projecting, in extracted position, from a discharge edge (1032) of said decanting tank (1012), said removal element (1030) being suitable, in said extracted position, for intercepting a scraping blade (1019) rising from the bottom (1015) of said tank (1012), and, sliding on said blade (1019) towards a withdrawn position, for removing the mainly solid residue (1051) from said scraping blade (1019).

6. Plant according to claim 5, wherein said further device (1031) for generating alternative motion is given by two further pneumatic valves (1037, 1037a, 1037b), between which said removal element (1030) is sandwiched, said further device (1031) for generating alternative motion being controlled by a timing mechanism (1040) for coordination with the rotary movement of the scraping blades (1019).

7. Plant according to claim 6, wherein said coordination timing mechanism (1040) comprises a pressure control valve (1041) in said further device (1031) for generating alternative motion, fixed to a wall (1029) of said box-shaped body (1011) and actuated through an automatic return leverage (1042), pushed by a cam (1043) rotating integrally with said blades (1019), said timing mechanism (1040) comprising as many cams (1043) as there are scraping blades (1019).

8. Plant according to claim 1 comprising a filter consisting of two concentric tubular bodies with reticular structure (2011, 2012), a sieve layer (2014) being present between said two tubular bodies suitable for holding chips from mechanical processing, the end sections (2015, 2016, 2017, 2018) of said two tubular bodies with sieve layer (2014) interposed, being sealed by a sealing edge (2020, 2021), characterised in that each of said sealing edges (2020, 2021) consists of a sealing ring (2020a, 2021a) equipped with a slit (2022, 2023) in which said end sections reversibly insert.

9. Plant according to claim 8, wherein said two tubular bodies are cylindrical, said sieve layer (2014) is made from nylon, and at least part of said sieve layer (2014) is made from steel mesh.

10. Plant according to claim 8, characterised in that said sealing ring (2020a, 2021a) is made from rubber.

11. Plant according to claim 8, wherein said sieve layer (2014) has longitudinal lips that are not stitched and overlapping each other.

12. Plant according to claim 11, wherein said unstitched sieve layer (2014) is obtained from a substantially rectangular portion of fabric, unwoven fabric, metallic mesh or similar, or from combinations of such materials, arranged adjacent to the inner surface (2011a) inside the first tubular body (2011) with its unwoven longitudinal lips overlapping.

13. A plant for treating leftover liquids of mechanical processing, comprising:
at least one chamber (6) that is divided into two parts (a) and (b) by a filtering partition (9); wherein:
part (a) includes an inlet for entry of a liquid to be filtered;
part (b) includes an outlet for exit of a filtered liquid;
vibratory means for causing a vibratory state in at least part (b) of the chamber for the exit of the filtered liquid;
wherein said vibratory means comprises a pressurized pneumatic system pneumatically connected to part (b) of the chamber to create intermittent pneumatic pressure impulses in at least part (b) of the chamber;
said pressurized pneumatic system comprising a compressed air source, a compressed air delivery duct, and a piloted open-close valve in the delivery duct;
at least one double suction submerged pump structure with vertical axis, comprising in a protective containment casing (3011); and
a rotation shaft (3012) on which at least a pair of opposite interfacing impellers (3013, 3113) fitted inside a chamber (3014);
wherein, below said pair of suction impellers (3013, 3113), a hollow tang, integral with said casing (3011), defining a seat (3020) for the bottom end (3019) of said shaft (3012), between said shaft (3012) and said seat (3020) in said tang being arranged rotational sliding means (3018) and corresponding further fluidic sealing means (3017) positioned between said rotational sliding means (3018) and said chamber (3014).

14. Plant according to claim 13, wherein said tang is made from a cup-shaped element (3028) extending below said chamber (3014) and open towards it, said cup-shaped element (3028) having, at its base (3029), an injection hole (3030) for a lubricant for said rotational sliding means (3018).

15. Plant according to claim 13, wherein said opposite interfacing suction impellers (3013, 3013a, 3013b) comprise blades.

16. A plant for treating leftover liquids of mechanical processing, comprising:
at least one chamber (6) that is divided into two parts (a) and (b) by a filtering partition (9); wherein:
part (a) includes an inlet for entry of a liquid to be filtered;
part (b) includes an outlet for exit of a filtered liquid;
vibratory means for causing a vibratory state in at least part (b) of the chamber for the exit of the filtered liquid;
wherein said vibratory means comprises a pressurized pneumatic system pneumatically connected to part (b) of the chamber to create intermittent pneumatic pressure impulses in at least part (b) of the chamber; and
said pressurized pneumatic system comprising a compressed air source, a compressed air delivery duct, and a piloted open-close valve in the delivery duct;
wherein a box shaped body (4041) equipped with an upper inlet mouth and with a discharge mouth (4046) for the liquid to be processed; at least one pneumatic valve suitable for regulating the opening and closing of said mouths, said valve consisting of a frame (4011) equipped with a first and second opening (4012, 4112, 4013), one for inlet and one for outlet, for the passage of fluids, inside said frame being arranged an air chamber (4014, 4114) that, inflating, is suitable for pushing a shutter (4015, 4115) against said first through opening (4012, 4112), said air chamber (4014, 4114) being arranged sandwiched between compression means (4016, 4116), suitable for disengaging said shutter (4015, 4115) from said first through opening (4012, 4112) in the absence of pressure inside said air chamber (4014, 4114).

17. Plant according to claim 16 characterised in that said compression means (4016) are given by a plurality of springs (4021) arranged between a compression plate (4022) of the air chamber (4014) and at least one of said first and second plate (4017, 4020), to move said compression plate (4022) in the direction of inflation of the air chamber (4014), said compression plate (4022) being locked to a second fastening ring (4023) coaxial and integral with the air chamber (4014) on the opposite side with respect to said first ring (4018).

18. Plant according to claim 16, comprising air compression means for blowing pressurised air into the upper part of said box-shaper body (4041) to make said liquid (4045a) inside said box-shaped body flow from said discharge mouth.

19. A plant for treating leftover liquids of mechanical processing, comprising:
at least one chamber (6) that is divided into two parts (a) and (b) by a filtering partition (9); wherein:
part (a) includes an inlet for entry of a liquid to be filtered;
part (b) includes an outlet for exit of a filtered liquid;
vibratory means for causing a vibratory state in at least part (b) of the chamber for the exit of the filtered liquid;
wherein said vibratory means comprises a pressurized pneumatic system pneumatically connected to part (b) of the chamber to create intermittent pneumatic pressure impulses in at least part (b) of the chamber;
said pressurized pneumatic system comprising a compressed air source, a compressed air delivery duct, and a piloted open-close valve in the delivery duct; and
an alternative part of said chamber intended for the alternative entry of the liquid to be filtered and of the washing liquid of the partition;
wherein said alternative part comprises a tubular container (5011) closed at the top by a cover (5012) and at the bottom by an openable filtering and discharge base plate (5013) hinged to it through articulation means (5014), said container (5011) being fed through an inlet mouth (5015) open on its high part (5011a), said base plate (5013) being equipped with a lower outlet channel (5016) for the liquids (5072) extracted from the muds (5070), and with a filtering element (5017) suitable for holding the solid part (5071) of said muds (5070) at the lower end section (5011 b) of said container (5011), said device (5010) having means for raising the pressure (5018) inside said container (5011), suitable for compressing said muds (5070) towards said filtering element (5017), air venting means (5019), also on the high part (5011 a) of the container (5011), and moving means (5020) suitable for opening/closing said base plate (5013).

20. Plant according to claim 19, wherein said supports (5023) rising from said cover (5012) are height-adjustable.

21. Plant according to claim 19, wherein said means for raising the pressure (5018) consist of at least one air-injector (5042) arranged to blow inside the container (5011) from the cover (5012) of said container (5011) itself.

22. Plant according to claim 19, wherein said means for raising the pressure (5018) comprise at least a further air-injector (5043) close to the lower end section (5011b) of said container (5011), suitable for remixing the layer made up of the solid part of said muds (5070) formed on the sieve (5034).

23. Plant according to claim 19, wherein said inlet mouth (5015) has opening/closing means (5048) suitable for adjusting the amount of muds (5070) poured into said container (5011).

24. Plant according to claim 19, characterised in that said venting means (5019) consist of a venting mouth (5049) open on said cover (5011) and equipped with further opening/closing means (5050).

\* \* \* \* \*